(12) United States Patent
Speas et al.

(10) Patent No.: US 12,331,152 B2
(45) Date of Patent: Jun. 17, 2025

(54) SUSTAINABLE RESILIENT PLANK

(71) Applicant: TOWER IPCO COMPANY LIMITED, Dublin (IE)

(72) Inventors: Eric Scott Speas, Calhoun, GA (US); Robert Corey Carter, Calhoun, GA (US); Perry Lamar Muse, Calhoun, GA (US); Erik Christopher Arnold, Calhoun, GA (US)

(73) Assignee: TOWER IPCO COMPANY LIMITED, Dublin (IE)

( * ) Notice: Subject to any disclaimer, the term of this patent is extended or adjusted under 35 U.S.C. 154(b) by 0 days.

(21) Appl. No.: 18/615,203

(22) Filed: Mar. 25, 2024

(65) Prior Publication Data

US 2024/0228691 A1     Jul. 11, 2024

Related U.S. Application Data

(63) Continuation of application No. 17/420,430, filed as application No. PCT/IB2021/050516 on Jan. 22, 2021, now Pat. No. 11,958,933.

(60) Provisional application No. 62/965,389, filed on Jan. 24, 2020.

(51) Int. Cl.
| | | |
|---|---|---|
| B32B 27/40 | (2006.01) |
| C08G 18/32 | (2006.01) |
| C08G 18/42 | (2006.01) |
| C08G 18/48 | (2006.01) |
| C08G 18/66 | (2006.01) |
| E04F 15/10 | (2006.01) |
| C08G 101/00 | (2006.01) |

(52) U.S. Cl.
CPC .......... *C08G 18/4854* (2013.01); *B32B 27/40* (2013.01); *C08G 18/3206* (2013.01); *C08G 18/4208* (2013.01); *C08G 18/6607* (2013.01); *E04F 15/107* (2013.01); *C08G 2101/00* (2013.01); *C08G 2110/0025* (2021.01); *C08G 2110/005* (2021.01); *E04F 15/105* (2013.01); *E04F 2290/00* (2013.01)

(58) Field of Classification Search
CPC ...................................................... B32B 27/40
See application file for complete search history.

(56) References Cited

U.S. PATENT DOCUMENTS

| | | |
|---|---|---|
| 2007/0129452 A1 | 6/2007 | Clatty |
| 2009/0023823 A1 | 1/2009 | Kim et al. |
| 2011/0086934 A1 | 4/2011 | Herrington |
| 2014/0255659 A1 | 9/2014 | Windmöller |

(Continued)

FOREIGN PATENT DOCUMENTS

| | | |
|---|---|---|
| EP | 3020885 A1 | 5/2016 |
| IN | 20161708255 | 1/2017 |

(Continued)

OTHER PUBLICATIONS

International Search Report and Written Opinion for PCT Application No. PCT/IB2021/050516.

(Continued)

*Primary Examiner* — Michael L Leonard
(74) *Attorney, Agent, or Firm* — Troutman Pepper Locke LLP; Ryan A. Schneider; Dustin B. Weeks

(57) ABSTRACT

An exemplary embodiment of the present disclosure provides a polyurethane core for use in a floor or wall panel, the core comprising a polyol made, at least in part, from one or more recycled materials, and an isocyanate.

15 Claims, 7 Drawing Sheets

(56) References Cited

U.S. PATENT DOCUMENTS

| | | |
|---|---|---|
| 2015/0367603 A1 | 12/2015 | Guandalini et al. |
| 2019/0119439 A1 | 4/2019 | Queen et al. |
| 2019/0153185 A1 | 5/2019 | Moennig |

FOREIGN PATENT DOCUMENTS

| | | |
|---|---|---|
| JP | 2000017068 A | 1/2000 |
| JP | 2004307583 A | 11/2004 |
| JP | 2018119398 A | 8/2018 |

OTHER PUBLICATIONS

Office Action for corresponding Chinese Application No. 202180023724.6 dated Jan. 17, 2024.
Li et al. "Decoration of Ground Pavement".
Examination Report for corresponding European Application No. 21702315.9 dated Jan. 25, 2024.
Office Action for Japanese Application No. 2022-544788 dated Nov. 21, 2024 and Machine English Translation.

SUSTAINABLE RESILIENT PLANK

CROSS-REFERENCE TO RELATED APPLICATIONS

This application is a continuation of U.S. patent application Ser. No. 17/420,430 filed 2 Jul. 2021, which is a U.S. national stage filing under 35 U.S.C. § 371 of International PCT Application No. PCT/IB2021/050516, filed 22 Jan. 2021, which claims the benefit of U.S. Provisional Application Ser. No. 62/965,389, filed on 24 Jan. 2020, each of which are incorporated herein by reference in their entirety as if fully set forth below.

FIELD OF THE DISCLOSURE

The various embodiments of the present disclosure relate generally to polymer-based building panels, and more particularly to polyurethane formulations having high-density properties for engineered floor, ceiling, and/or wall panels.

BACKGROUND

Engineered building panels and tiles are commonly used in businesses, homes, and institutions and offer many benefits ranging from enhanced floor protection, comfort, design versatility, low maintenance and, in some cases, easy installation. Additionally, engineered building panels can replace wood and plywood, providing environmental benefits, namely by reducing deforestation.

Engineered panels and tiles are composed of several layers. The outer layer, or image layer, having a high-resolution decorative image of wood, tile, or stone is often sealed under a protective resin-based coating. The core layer, where the majority of the density of the entire panel resides, provides structure. A backing layer holds the engineered panel together. Some engineered panels and tiles also include an attached underlayment layer for easier installation. The panels and tiles can be laid on a surface and mechanically coupled together to form floor coverings and wall or ceiling sheathing without the use of an adhesive, thereby reducing the labor and time of the installing phase. Such a kind of floor covering is known as a floating floor covering.

In recent years, manufacturers have developed panels and tiles with polymeric rigid cores made of vinyl-based polymers mixed with additives such as wood-plastic composite (WPC) or stone polymer composite (SPC). The composition of the core impacts properties such as rigidity or stiffness, thickness, water resistance, thermal insulation, acoustic insulation, density, and durability of the entire panel. One of the shortcomings of vinyl-based floor or wall panels is a tendency to curling. Curling is the result of expansion and shrinking of the layers within floor or wall panels upon changing temperatures. Different degrees of shrinking and/or expansion of the vinyl-based floor or wall panels results either a positive curling or negative curling, and non-flat floor or wall panels. Curling of adjacent floor or wall panels can lead to damage such as, for example, panels decoupling, joints becoming stressed, and/or delamination of the surface.

The polymer-based floor or wall panels having one or more layers comprising polyurethane disclosed herein has surprisingly been found to provide better dimensional stability, improved acoustic insulation, and enhanced flexural and locking strength compared to existing panels having conventional vinyl-based cores. In particular, the polymer-based floor or wall panels can achieve a desired balance of high-density and improved flexural strength. Additionally, the formulations of the present disclosure can optionally be made, at least in part, from recycled or reusable materials. The environmental benefit of starting from recycled or reusable materials, such as recycled carpet fibers or plastic bottles, can help reduce plastic waste entering landfills or the world's water bodies while producing a sustainable and resilient alternative to conventional vinyl-based panels.

BRIEF SUMMARY

The present disclosure relates to polyurethane core for use in floor or wall panels. An exemplary embodiment of the present disclosure provides a polyurethane core comprising a polyol made, at least in part, from one or more recycled materials and an isocyanate.

In any of the embodiments disclosed herein, the polyol can comprise from about 1% to about 40% by weight of the one or more recycled materials.

In some embodiments, the polyol can comprise a polyester polyol and/or a polyether polyol.

In some embodiments, the one or more recycled materials can comprise polyester terephthalate carpet fibers.

In certain embodiments, the one or more recycled materials can comprise polyethylene terephthalate bottles.

In some embodiments, the isocyanate can comprise at least one polyisocyanate.

In some embodiments, the polyisocyanate can have an NCO content from about 25 wt. % to about 35 wt. %.

In some embodiments, the polyisocyanate can comprise a methylene diphenyl diisocyanate (MDI).

In some embodiments, the methylene diphenyl diisocyanate can be selected from the group consisting of 2,2'-MDI, 2,4'-MDI and 4,4'-MDI.

In some embodiments, the methylene diphenyl diisocyanate can have a NCO content of 27.5 wt. %, a viscosity of 140 cps at 25° C., a density of 1.20 g/cm$^3$ at 25° C., an initial boiling point of 190° C. at 5 mm Hg, a vapor pressure of 0.0002 mm Hg at 25° C., and a functionality of approximately 2.2.

In some embodiments, the methylene diphenyl diisocyanate can have a NCO content of 31.5 wt. %, a viscosity of 200 cps at 25° C., a density of 1.23 g/cm$^3$ at 25° C., an initial boiling point of 190° C. at 5 mm Hg, a vapor pressure of 0.0002 mm Hg at 25° C., and a functionality of approximately 2.7.

In some embodiments, the methylene diphenyl diisocyanate can have a NCO content of 32.4 wt. %, a viscosity of 17 cps at 25° C., a density of 1.22 g/cm$^3$ at 25° C., an initial boiling point of 190° C. at 5 mm Hg, a vapor pressure of 0.00001 mm Hg at 25° C., and a functionality of approximately 2.01.

In some embodiments, the core can comprise from about 5% to about 50% by weight of polyisocyanate.

In some embodiments, the polyurethane core can further comprise a chain extender.

In some embodiments, the chain extender can be selected from the group consisting of butanediol (BDO), diethylene glycol (DEG), ethylene glycol, propylene glycol, diethanolamine, trimethylolpropane, and combinations thereof.

In some embodiments, the core can comprise from about 0% to about 5% by weight of the chain extender.

In some embodiments disclosed herein, the polyurethane core can further comprise a catalyst.

In some embodiments, the catalyst can comprise a metal-based catalyst.

In some embodiments, the catalyst can comprise a gelling catalyst.

In some embodiments, the catalyst can comprise a heat-activated catalyst.

In some embodiments, the polyurethane core can further comprise a dispersant and/or a surfactant.

In some embodiments, the polyurethane core can further comprise at least one filler.

In some embodiments, the at least one filler can comprise calcium carbonate.

In some embodiments, the core can comprise from about 0% to about 60% by weight of the at least one filler.

In some embodiments, the core can exhibit a dimensional stability equal to or less than 0.30% change at 70° C.

In some embodiments, the core can exhibit a dimensional stability equal to or less than 0.40% change at 80° C.

In some embodiments, the core can exhibit a dimensional stability equal to or less than 0.30% at 70° C. and a dimensional stability equal to or less than 0.40% at 80° C.

In some embodiments, the core can exhibit a first dimensional stability expressed as a percentage at 70° C. and a second dimensional stability expressed as a percentage at 80° C., wherein the second dimensional stability can be less than 0.30 greater than the first dimensional stability.

In some embodiments, the core can have a thickness of about 4 mm, and wherein the core can exhibit a flexural strength of at least 30 MPa.

In some embodiments, wherein the core can have a thickness of about 4 mm, wherein the core can exhibit a flexural strength from about 30 MPa to about 80 MPa.

In some embodiments, the core can have a thickness of about 4 mm, wherein the core can exhibit a flexural strength from about 35 MPa to about 65 MPa.

In some embodiments, the core can have a thickness of about 6.4 mm, wherein the core can exhibit a flexural strength of at least 100 MPa.

In some embodiments, the core can have a density of about 1.4 g/cm$^3$ to about 2.0 g/cm$^3$.

In some embodiments, the core can have a density of about 1.4 g/cm$^3$ to about 1.8 g/cm$^3$.

An exemplary embodiment of the present disclosure provides a polymer-based floor or wall covering panel comprising a polyurethane core and at least one substrate and optionally a top layer. The polyurethane core can comprise a polyol made, at least in part, from one or more recycled materials and an isocyanate.

In some embodiments, the panel can exhibit a dimensional stability equal to or less than 0.20% at 70° C. and a dimensional stability equal to or less than 0.30% at 80° C.

In some embodiments, the panel can exhibit a first dimensional stability expressed as a percentage at 70° C. and a second dimensional stability expressed as a percentage at 80° ° C., wherein the second dimensional stability is less than 0.20 greater than the first dimensional stability.

In some embodiments, the panel can comprise a tension strength greater than 10 kN/m on at least one side of the panel.

In some embodiments, the panel can comprise a residual indentation less than 2%.

In some embodiments, the panel can comprise a long-term indentation less than 0.20 mm.

In some embodiments, the panel can comprise a long-term indentation less than 0.10 mm.

In some embodiments, the substrate can comprise a component from recycled materials.

An exemplary embodiment of the present disclosure provides a process of producing a polyurethane core for use in a floor or wall panel, the method can comprise forming a mixture and extruding the mixture to form a core. The mixture can comprise a polyol and an isocyanate. The polyol can be made, at least in part, from one or more recycled materials. The method can optionally include annealing a substrate to the core. The method can optionally include laminating a top layer to said core and substrate.

An exemplary embodiment of the present disclosure provides a floor or wall covering panel comprising a polyurethane-based core, a decorative print layer positioned proximate a top surface of the core, and a protective layer positioned proximate a top surface of the decorative print layer. The polyurethane-based core can comprise a polyol made, at least in part, from one or more recycled materials and an isocyanate.

In some embodiments, the panel can further comprise an underlayment pad positioned proximate a bottom surface of the core.

In some embodiments, the underlayment pad can be a polyurethane-based underlayment pad. The polyurethane-based underlayment pad can comprise a polyol made, at least in part, from one or more recycled materials and an isocyanate.

In some embodiments, the polyurethane-based core can be a polyurethane foam.

In some embodiments, the polyurethane-based underlayment pad can be a polyurethane foam.

In some embodiments, the core can have a density of between about 60 to 90 lbs/ft$^3$.

In some embodiments, the core can further comprise a reinforcing layer of fiberglass.

In some embodiments, the core can further comprise one or more chain extenders present in an amount of up to 30 parts per 100 parts of polyol in the core.

In some embodiments, the core can further comprise one or more catalysts present in an amount of up to 2 parts per 100 parts of polyol in the core.

In some embodiments, the core can further comprise one or more dispersants present in an amount of up to 10 parts per 100 parts of polyol in the core.

In some embodiments, the core can further comprise one or more fillers present in an amount of up to 500 parts per 100 parts of polyol in the core.

In some embodiments, the core can further comprise one or more surfactants present in an amount of up to 2 parts per 100 parts of polyol in the core.

In some embodiments, the core can further comprise one or more moisture scavengers present in an amount of up to 10 parts per 100 parts of polyol in the core.

In some embodiments, the polyol of the core can comprise about 1% to about 40% by weight of the one or more recycled materials.

In some embodiments, the isocyanate can be present in an amount of 100-250 parts per 100 parts of polyol in the core.

In some embodiments, the protective layer can comprise a polyurethane.

In some embodiments, the polyurethane of the protective layer can comprise an isocyanate and a polyol made, at least in part, from one or more recycled materials.

In some embodiments, the one or more recycled materials of the polyol of the core can comprise polyester terephthalate (PET) carpet fibers.

In some embodiments, the one or more recycled materials of the polyol of the underlayment can comprise polyester terephthalate (PET) carpet fibers.

In some embodiments, the one or more recycled materials of the polyol of the core can comprise polyester terephthalate (PET) plastic bottles.

In some embodiments, the one or more recycled materials of the polyol of the underlayment can comprise polyester terephthalate (PET) plastic bottles.

In some embodiments, the core can further comprise one or more glycols and/or diols.

In some embodiments, the one or more glycols and/or diols can comprise polytetrahydrofuran (polyTHF).

In some embodiments, the isocyanate of the core can comprise a polyisocyanate.

In some embodiments, the one or more chain extenders can be selected from the group consisting of butanediol (BDO), diethylene glycol (DEG), ethylene glycol, propylene glycol, diethanolamine, trimethylolpropane, and combinations thereof.

In some embodiments, the one or more catalysts can be selected from the group consisting of a metal-based catalyst, a gelling catalyst, and a heat-activated catalyst.

In some embodiments, the core can further comprise polyvinyl butyral.

In some embodiments, the panel can exhibit a vertical dimensional stability of 0.05-0.25% at 80° C.

In some embodiments, the panel can exhibit a vertical dimensional stability of 0.08-0.25% at 80° ° C.

In some embodiments, the panel can exhibit a vertical dimensional stability of 0.05-0.20% at 80° C.

In some embodiments, the panel exhibits a vertical dimensional stability of 0.05-0.15% at 80° C.

In some embodiments, the panel can exhibit a vertical dimensional stability of 0.08-0.20% at 80° ° C.

In some embodiments, the panel can exhibit a vertical dimensional stability of about 0.08-0.15% at 80° C.

In some embodiments, the panel can exhibit a vertical dimensional stability of about 0.10-0.25% at 80° ° C.

In some embodiments, the panel can exhibit a vertical dimensional stability of about 0.10-0.15% at 80° ° C.

In some embodiments, the core can exhibit a flexural strength of between 30 and 65 MPa.

An exemplary embodiment of the present disclosure provides a floor or wall covering panel, comprising a polyurethane-based core, a decorative print layer positioned proximate a top surface of the core, and a protective layer positioned proximate a top surface of the decorative print layer. The polyurethane-based core can comprise a polyol made, at least in part, from one or more recycled materials and an isocyanate.

In some embodiments, the panel can further comprise an underlayment pad positioned proximate a bottom surface of the core.

In some embodiments, the underlayment pad can be a polyurethane-based underlayment pad comprising a polyol made, at least in part, from one or more recycled materials and an isocyanate.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

DETAILED DESCRIPTION

To facilitate an understanding of the principles and features of the present disclosure, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

Unless defined otherwise, all technical and scientific terms used herein have the same meaning as commonly understood by one of ordinary skill in the art to which this invention belongs.

The term "aliphatic" or "aliphatic group", as used herein, means a straight-chain (i.e., unbranched) or branched, substituted or unsubstituted hydrocarbon chain that is completely saturated or that contains one or more units of unsaturation or a monocyclic hydrocarbon, bicyclic hydrocarbon, or tricyclic hydrocarbon that is completely saturated or that contains one or more units of unsaturation, but which is not aromatic (also referred to herein as "carbocycle," "cycloaliphatic" or "cycloalkyl"), that has a single point of attachment to the rest of the molecule. Unless otherwise specified, aliphatic groups contain 1-30 aliphatic carbon atoms. In some embodiments, aliphatic groups contain 1-20 aliphatic carbon atoms. In other embodiments, aliphatic groups contain 1-10 aliphatic carbon atoms. In still other embodiments, aliphatic groups contain 1-8 aliphatic carbon atoms, and in yet other embodiments, aliphatic groups contain 1, 2, 3, or 4 aliphatic carbon atoms. Suitable aliphatic groups include, but are not limited to, linear or branched, substituted or unsubstituted alkyl, alkenyl, alkynyl groups and hybrids thereof such as (cycloalkyl)alkyl, (cycloalkenyl)alkyl or (cycloalkyl)alkenyl.

Figure 1:
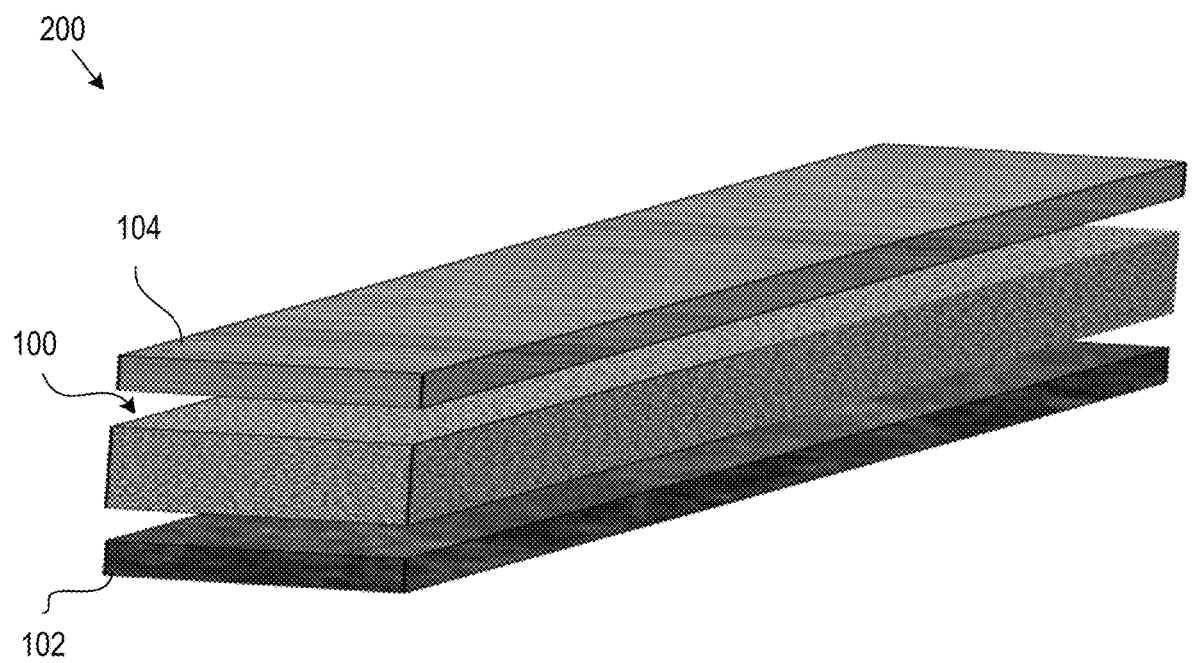
FIG. 1 shows a partially extended view of a sustainable resilient plank ("SRP"), in accordance with an exemplary embodiment of the present disclosure.

As shown in FIG. 1, an exemplary embodiment of the present invention provides a polyurethane core comprising a polyol made, at least in part, from one or more recycled materials and an isocyanate. The polymer-based floor or wall covering panels can have a core layer 100 substantially composed of polyurethane that comprises the polyurethane reaction product of a polyol and an isocyanate. In some embodiments, the core 100 can be composed of a foamed polyurethane.

The core 100 may include additional components that incorporate various additives to the core or the cured product that can change the appearance, properties, handling characteristics or performance of the core. For example, the core formulation of the present disclosure may also include UV stabilizers, anti-block pigments, antimicrobial agents, tints, dyes, wetting agents, surfactants, antifoaming agents, plasticizers, and/or blowing agents. Other materials include, but are not limited to, impact strength enhancers, reinforcing agents, reaction rate enhancers or catalysts, crosslinking agents, optical brighteners, propylene carbonates, coloring agents, fluorescent agents, whitening agents, hindered amine light stabilizers, processing aids, mica, talc, nano-fillers, silane coupling agents, anti-slip agents, water affinity or repulsion components, water-activated agents, viscosifiers, flowaids, anticaking agents, wetting agents, and/or toughening agents such as one or more block copolymers. The core 100 may comprise components and ranges parts per hundred parts resin of polyol (phr) and/or parts by weight according to Formula (I), although more components can be included, and some components can be excluded. For purposes of illustration as shown in Formula (I), for every 100 parts of polyol in the formula, there are five parts of chain extender. Additionally, for every 100 parts of polyol in the formula, various embodiments of Formula (I) can have 0-30 parts of the chain extender.

| Formula (I): | | |
|---|---|---|
| Component | phr | Range (parts by weight) |
| Polyol | 100.00 | |
| Chain extender | 5.00 | 0-30 |
| Catalyst | 0.13 | 0-2 |
| Dispersant | 5.00 | 0-10 |
| Filler | 200.00 | 0-500 |
| Surfactant | 0.25 | 0-2 |
| Moisture scavenger | 5.00 | 0-10 |
| Isocyanate | 125.37 | 100-250 |
| | 440.75 | |

A wide variety of polymer resins may be used in forming a core suitable for the application of the present disclosure, including polyols such as polyether polyol, polyester polyol, mannich polyol, glycerine/sucrose polyol and combinations thereof. Polyol resins can be formed, at least in part, from recycled and/or renewable components, such as, for example, polyester terephthalate (PET) from carpet fibers or polyurethane foams from carpet underlayment and other cushioning materials. Other polyols from pre- and/or post-consumer products are also contemplated, for example, plastic bottles (i.e. soda bottles, water bottles, food jars, etc.), including scraps of plastic and/or waste from the manufacturing process of bottles. In some embodiments, polyol resins may be formed from recycled polyurethane foams. In certain embodiments, the polymer resins may be generated from bio-derived materials, such as, for example, polyols derived from vegetable oils, caster, soybean, cotton seed, neem seed, and the like.

In some embodiments, the polymer resins may be generated from mechanical recycling methods including, but not limited to, rebonding flexible foam, regrinding or powdering, adhesive pressing or particle bonding, and compression molding. In some embodiments, polymer resins may be generated from chemical recycling methods including, but not limited to, glycolysis, hydrolysis, pyrolysis, and hydrogenation.

Polyols used herein can include hydroxyl numbers ranging from about 230 to about 500 mg KOH/g. Polyols used herein can have a water content below 0.2% by weight, for example, ranging from about 0.02% to about 0.18% by weight. Polyols used herein can have an acid number equal to or under 2 mg KOH/g, in particular, ranging from 0.9 to 1.9 mg KOH/g. Polyol used herein can have a functionality ranging from about 2 to about 4, such as about 2.0 to about 2.2, about 2.2 to about 2.4, about 2.4 to about 2.6, about 2.6 to about 2.8, about 2.8 to about 3.0, about 3.2 to about 3.6, or about 3.6 to about 4.0. Polyols used herein can have an OH content ranging from about 10% to about 21% by weight, such as about 10% to about 13%, about 12% to about 15%, about 14% to about 17%, about 16% to about 19%, or about 18% to about 21%. Polyols used herein can have a viscosity ranging from about 2,500 to about 6,000 Centipoise (cps) at 25° C. Polyols used herein can have a density from about 10.2 to about 10.4 pounds per gallon. Polyols used herein can have a specific gravity ranging from about 1.2 to about 1.3 at 25° C.

Arropol 36® is one polyol used in some embodiments of the present disclosure. Arropol 36 is an aromatic polyester polyol manufactured by Arropol Chemicals, Inc., Dalton, Georgia, or ArrowStar, LLC, Dalton Georgia, and is derived from post-consumer polyester terephthalate (PET) carpet fiber. Arropol 36 comprises 50% recycle material, including pre-consumer and/or post-consumer material) and is formed by melting the PET carpet fiber and hydrating the melted PET to form a polyol. Arropol 36 has a hydroxyl number ranging from 350 to 450, typically around 397.69 mg KOH/g, a water content of 0.07% (<0.2%) by weight, an acid number of 0.97 (<2) mg KOH/g, an equivalence of 141.06 weight average, an average molecular weight of 297.65, a functionality of 2.11, an OH content of 12.05%, a viscosity of 2,100 cps spindle #5 at 20 rpm, a density of 10.27 pounds per gallon and a specific gravity of 1.231. Terol® is another aromatic polyester polyol used in some embodiments of the present disclosure and is manufactured by Huntsman Corporation. Terol 11 comprises around 6.1% pre-consumer recycle material and around 15.8% post-consumer recycle material. Terol 11 has a hydroxyl number ranging from 410 to 460, typically around 435 mg KOH/g, a water content of 0.05% (<0.10%) by weight, an acid number of 1.0 (<2.0) mg KOH/g, a functionality of 2.0, a viscosity of 1,000 cps at 25° C., and a specific gravity of 1.23. Terol 250 comprises around 8.2% pre-consumer recycle material and around 21.1% post-consumer recycle material. Terol 250 has a hydroxyl number ranging from 235 to 255, typically around 250 mg KOH/g, a water content of 0.05% (<0.15%) by weight, an acid number of 1.0 (<2.0) mg KOH/g, a functionality of 2.0, a viscosity of 5,000 cps at 25° C., and a specific gravity of 1.234.

In some embodiments, the polyol can comprise from about 1% to about 40% by weight of the one or more recycled materials (e.g., from about 1% to 5%, from about 5% to 10%, from about 10% to 15%, from about 15% to 20%, from about 20% to 25%, from about 25% to 30%, from about 30% to 35%, or from about 35% to 40%).

In some embodiments, glycols and/or diols can be used in combination with or to replace a portion of polyol resin. Diols can include, polycarbonate diols such as polyester diol, polyether diol, ethylene glycol, polytetrahydrofuran (polyTHF) can optionally be added to the core to react with the polyol and isocyanate. In some embodiments, the glycol can comprise from about 0% to about 20% by weight of the one or more recycled materials (e.g., from about 1% to 5%, from about 5% to 10%, from about 10% to 15%, or from about 15% to 20%).

In some embodiments, polyvinyl butyral (PVB) resins can be used in combination with or to replace a portion of polyol resin. In some embodiments PVB can act as a foaming agent. In such a case, the PVB can lower the density of the polyurethane core without reducing the rigidity or strength of the core. PVB resins are acetals formed from the reaction between aldehydes and polyvinyl alcohols. Butvar resins are polyvinyl butyral resin from Eastman Chemical Company, Kingsport, Tennessee. Butvar 90 has a molecular weight average from about 70 to about 100 thousand, a solution viscosity between 600 to 1,200 cps in 15%-by-weight solution in 60:40 toluene/ethanol at 25° C., a specific gravity of 1.100, a water absorption of 0.5% within 24 hours, a hydroxyl content between 18.5% and 20.5%, an acetate content between 0% and 2.5%, and a butyral content of 80%. Butvar 72 has a molecular weight average from about 170 to about 250 thousand, a solution viscosity between 7,000 to 14,000 cps in 15%-by-weight solution in 60:40 toluene/ethanol at 25° C., a specific gravity of 1.100, a water absorption of 0.5% within 24 hours, a hydroxyl content between 17.5% and 20.0%, an acetate content between 0% and 2.5%, and a butyral content of 80%. Butvar 74 has a molecular weight average from about 120 to about 150 thousand, a solution viscosity between 3,000 to 7,000 cps in 15%-by-weight solution in 60:40 toluene/ethanol at 25° C., a specific gravity of 1.100, a water absorption of 0.5% within 24 hours, a hydroxyl content between 17.5% and 20.0%, an acetate content between 0% and 2.5%, and a butyral content of 80%. Butvar 76 has a molecular weight average from about 90 to about 120 thousand, a solution viscosity between 500 to 1,000 cps in 15%-by-weight solution in 60:40 toluene/ethanol at 25° C., a specific gravity of 1.083, a water absorption of 0.3% within 24 hours, a hydroxyl content between 11.5% and 13.5%, an acetate content between 0% and 2.5%, and a butyral content of 80%. Butvar 79 has a molecular weight average from about 50 to about 80 thousand, a solution viscosity between 100 to 400 cps in 15%-by-weight solution in 60:40 toluene/ethanol at 25° C., a specific gravity of 1.083, a water absorption of 0.3% within 24 hours, a hydroxyl content between 11.5% and 13.5%, an acetate content between 0% and 2.5%, and a butyral content of 80%. Butvar 98 has a molecular weight average from about 40 to about 70 thousand, a solution viscosity between 200 to 400 cps in 15%-by-weight solution in 60:40 toluene/ethanol at 25° C., a specific gravity of 1.100, a water absorption of 0.5% within 24 hours, a hydroxyl content between 18.0% and 20.0%, an acetate content between 0% and 2.5%, and a butyral content of 80%.

Isocyanates used herein can be cycloaliphatic, aliphatic, and/or aromatic. Examples of isocyanates include: toluol-2,4-diisocyanate; toluol-2,6-diisocyanate (TDI); 1,5-naphthalindiisocyanate; cumol-2,4-diisocyanate; 4-methoxy-1,3-phenyldiisocyanate; 4-chloro-1,3-phenyldiisocyanate; diphenylmethane-4,4-diisocyanate; diphenylmethane-2,4-diisocyanate; diphenylmethane-2,2-diisocyanate; 4-bromo-1,3-phenyldiisocyanate; 4-ethoxy-1,3-phenyl-diisocyanate; 2,4'-diisocyanate diphenylether; 5,6-dimethyl-1,3-phenyl-diisocyanate; methylene diphenyl diisocyanate (including 2,2'-MDI, 2,4'-MDI and 4,4"-MDI); 4,4-diisocyanato-diphenylether; 4,6-dimethyl-1,3-phenyldiisocyanate; 9,10-anthracene-diisocyanate; 2,4,6-toluol triisocyanate; 2,4,4'-triisocyanatodiphenylether; 1,4-tetramethylene diisocyanate; 1,6-hexamethylene diisocyanate; 1,10-decamethylene-diisocyanate; 1,3-cyclohexylene diisocyanate; 4,4'-methylene-bis-(cyclohexylisocyanate); xylol diisocyanate; 1-isocyanato-3-methyl-isocyanate-3,5,5-trimethylcyclohexane (isophorone diisocyanate); 1-3-bis(isocyanato-1-methylethyl) benzol (m-TMXDI); 1,4-bis(isocyanato-1-methylethyl) benzol (p-TMXDI); oligomers or polymers of the above mentioned isocyanate compounds; or mixtures of two or more of the above mentioned isocyanate compounds or oligomers or polymers thereof. A variety of polymeric isocyanates can be used in various embodiments of the present disclosure. Suitable examples include polymers and oligomers of diphenylmethane diisocyanates (MDIs and pMDIs), toluene diisocyanates (TDIs), hexamethylene diisocyanates (HDIs), isophorone diisocyanates (IPDIs), and combinations thereof. Isocyanates are available from the Dow Chemical Company under the tradename TERAFORCE™, ISONATE™, VORASTAR™, HYPOL™, and PAPI™, from BASF under the registered name LUPRANATE®, or from Huntsman under the registered name SUPRASEC®.

Polyisocyanates used herein can include a functionality from about 2.0 to about 2.7, NCO content from about 25 wt. % to about 35 wt. %, viscosity from around 15 to about 200 cps at 25° C., flash points above 200° C. (COC), densities ranging from about 1.2 grams per cubic centimeter to about 1.4 grams per cubic centimeter at 25° C., initial boiling points around 190° C. at 5 mm Hg, and vapor pressures ranging from about 0.00001 mm Hg to about 0.0010 mm Hg at 25° C. In some embodiments, prepolymer isocyanates can be used in addition to or in place of polyisocyanates. Prepolymer isocyanates can include substantially similar functionalities and properties as polyisocyanates, including, for example, functionality from about 2.0 to 2.7, NCO content from about 25 wt. % to about 35 wt. %, although prepolymer isocyanates with NCO content less than 25 wt. % (e.g., less than about 24 wt. %, less than about 20 wt. %, less than about 15 wt. %, less than about 10 wt. %, less than about 8 wt. %, less than about 5 wt. %, or less than about 3 wt. %) can be used. In some embodiments, the core can comprise one or more polyisocyanates ranging from about 100 to about 250 parts per hundred parts resin (of polyol), (e.g., from about 100 to 105, from about 105 to 110, from about 110 to 115, from about 115 to 120, from about 120 to 125, from about 125 to 130, from about 130 to 135, from about 135 to 140, from about 140 to 145, from about 145 to 150, from about 150 to 155, from about 155 to 160, from about 160 to 165, from about 165 to 170, from about 170 to 175, from about 175 to 180, from about 180 to 185, from about 185 to 190, from about 190 to 195, from about 195 to 200, from about 200 to 205, from about 205 to 210, from about 210 to 215, from about 215 to 220 from about 220 to 225, from about 225 to 230, from about 230 to 235, from about 235 to 240, from about 240 to 245, or from about 245 to 250). In some embodiments, the core can comprise from about 5% to about 50% by weight of polyisocyanate, including, for example, from about 5% to 10%, from about 10% to 15%, from about 15% to 20%, from about 20% to 25%, from about 25% to 30%, from about 30% to 35%, from about 35% to 40%, from about 40% to 45%, or from about 45% to 50%.

Chain extenders, curing agents, and crosslinkers can optionally be added to the core for increased hardness and strength. Chain extenders can include low molecular weight diols and/or diamines and can be aliphatic or aromatic. Suitable chain extenders include, but are not limited to, 1,4-butanediol (BDO), diethylene glycol (DEG), ethylene glycol, propylene glycol, 2-methyl-1,3-propylene diol, trimethylolpropane, N,N'-bis(2-hydroxypropylaniline), diethanolamine, 1,6-hexamethylenediamine, ethylenediamine (EDA), dimethylol butanoic acid (DMBA), isophorone diamine, 4,4'-bis(sec-butylamine)dicyclohexylmethane, 4,4'-bis(sec-butylamine)diphenylmethane, diethyltoluene diamine, 4,4'-methylene bis(2-chloroaniline), 4-chloro-3,5-diamino-benzoic acid isobutylester, 2,5-dimethylthio-toluene diamine, trimethylene glycol-di-p-aminobenzoate, 4,4'-methylene bis(3-chloro-2,6-diethylaniline), and combinations thereof. In some embodiments, the core can comprise one or more chain extenders ranging from 0 to about 30 parts per hundred parts resin (of polyol), such as, for example, from about 0 to 5, from about 5 to 10, from about 10 to 15, from about 15 to 20, from about 20 to 25, or from about 25 to 30. In some embodiments, the core can comprise from about 0% to about 5% by weight of the chain extender (e.g., from about 0% to 0.5%, from about 0.5% to 1.0%, from about 1.0% to 1.5%, from about 1.5% to 2.0%, from about 2.0% to 2.5%, from about 2.5% to 3.0%, from about 3.0% to 3.5%, from about 3.5% to 4.0%, from about 4.0% to 4.5%, or from 4.5% to 5.0%).

Catalysts in polyurethane systems can optionally be used to promote and accelerate gelation and polymerization of the polyurethane core. In some embodiments, a metal-based gelling catalyst, such as nickel, copper, or bismuth, can be used to generate the high-density rigid core. N-200 is a heat-activated gel catalyst for polyurethane formation and is available from Evonik Industries AG, Essen, Germany. In certain embodiments, an amine-based gelling catalyst can be used to generate the high-density rigid foamed core. Suitable amine-based catalysts include, but are not limited to 1,4-diazabicyclo-[2,2,2]-octane (DABCO), 2,2'-bis-(dimethyl-aminoethylether) (BDMAEE), N-methylmorpholine, 2-morpholinoethanol, N,N-Bis-(3-dimethylaminopropyl)-N-isopropanolamine, N,N-Bis-(3-dimethylaminopropyl) amine, N,N,N'-trimethyl-N'-(2-hydroxyethyl)bis(2-aminoethyl) ether. A1 is an amine catalyst for polyurethane formation available from Evonik Industries. In some embodiments, potassium-based catalysts, such as potassium octoate or potassium 2-ethyl hexanoate, can be used to generate the high-density rigid foamed core catalysts. Potassium octoate is an isocyanurate catalyst available from Momentive Performance Materials, Inc., Waterford, New York. In some embodiments, the core can comprise one or more catalysts ranging from 0.1 to about 2 parts per hundred parts resin (of polyol) (e.g., from about 0.01 to 0.10, from about 0.11 to 0.20, from about 0.21 to 0.30, from about 0.31 to 0.40, from about 0.41 to 0.50, from about 0.51 to 0.60, from about 0.61 to 0.70, from about 0.71 to 0.80, from about 0.81 to 0.90, from 0.91 to 1.00, from about 1.01 to 1.10, from about 1.11 to 1.20, from about 1.21 to 1.30, from about 1.31 to 1.40, from about 1.41 to 1.50, from about 1.51 to 1.60, from about 1.61 to 1.70, from about 1.71 to 1.80, from about 1.81 to 1.90, or from 1.91 to 2.00).

Fillers can optionally be added to the core to increase density and hardness, among other properties. In some embodiments, fillers can comprise flame retardants, for example, FR-125 and FR-782 are fire retardants available from Cellular Technology International Inc., Birmingham, England. Fillers can include barium sulfate, calcium carbonate, expanded silicas, colloidal silicas, vermiculite, silicates, wood flour, rice husk, straw, clay, sand, glass fibers, glass spheres, and combinations thereof. In some embodiments, the core can comprise one or more fillers ranging from 0 to about 500 parts per hundred parts resin (of polyol), (e.g., from about 0 to 10, from about 10 to 20, from about 20 to 30, from about 30 to 40, from about 40 to 50, from about 50 to 60, from about 60 to 70, from about 70 to 80, from about 80 to 90, from about 90 to 100, from about 100 to 110, from about 110 to 120, from about 120 to 130, from about 130 to 140, from about 140 to 150, from about 150 to 160, from about 160 to 170, from about 170 to 180, from about 180 to 190, from about 190 to 200, from about 200 to 210, from about 210 to 220, from about 220 to 230, from about 230 to 240, from about 240 to 250, from about 250 to 260, from about 260 to 270, from about 270 to 280, from about 280 to 290, from about 290 to 300, from about 300 to 310, from about 310 to 320, from about 320 to 330, from about 330 to 340, from about 340 to 350, from about 350 to 360, from about 360 to 370, from about 370 to 380, from about 380 to 390, from about 390 to 300, from about 400 to 410, from about 410 to 420, from about 420 to 430, from about 430 to 440, from about 440 to 450, from about 450 to 460, from about 460 to 470, from about 470 to 480, from about 480 to 490, from about 490 to 500), although higher ranges are contemplated. In some embodiments, the core can comprise one or more filler from about 0% to about 60% by weight (e.g., from about 0% to 5%, from about 5% to 10%, from about 10% to 15%, from about 15% to 20%, from about 20% to 25%, from about 25% to 30%, from about 30% to 35%, from about 35% to 40%, from about 40% to 45%, from about 45% to 50%, from about 50% to 55%, or from about 55% to 60%).

Dispersants and wetting agents can optionally be added to the core to improve filler dispersion and reduce viscosity. In some embodiments, dispersants can be used to overcome higher viscosities associated to high filler loadings. CA-71 is a wetting agent available from Univar. In some embodiments, the core can comprise one or more dispersants and/or wetting agents ranging from 0 to about 10 parts per hundred parts resin (of polyol) (e.g., 0 to 1, about 1 to 2, about 2 to 3, about 3 to 4, about 4 to 5, about 5 to 6, about 6 to 7, about 7 to 8, about 8 to 9, or about 9 to 10).

Surfactants can optionally be added to the core to improve component dispersion, namely by lowering surface tension, promote emulsification and nucleation during mixing. In some embodiments, surfactants can include organosiloxanes or silicone-based surfactants. DC193 is a silicone surfactant available from Evonik Industries. In some embodiments, the core can comprise one or more surfactants ranging from 0 to about 2 parts per hundred parts resin (of polyol) (e.g., from about 0.01 to 0.10, from about 0.11 to 0.20, from about 0.21 to 0.30, from about 0.31 to 0.40, from about 0.41 to 0.50, from about 0.51 to 0.60, from about 0.61 to 0.70, from about 0.71 to 0.80, from about 0.81 to 0.90, from 0.91 to 1.00, from about 1.01 to 1.10, from about 1.11 to 1.20, from about 1.21 to 1.30, from about 1.31 to 1.40, from about 1.41 to 1.50, from about 1.51 to 1.60, from about 1.61 to 1.70, from about 1.71 to 1.80, from about 1.81 to 1.90, or from 1.91 to 2.00).

Molecular sieves and/or moisture scavengers can optionally be added to the core to remove moisture, increase storage stability, and/or increase dispersion. For high-density materials, it is important to remove any trace amounts of moisture typically found in raw materials. In some embodiments, the molecular sieves and/or moisture scavengers can comprise renewable and recyclable materials. Molecular sieves can include zeolite-based pastes or powders. Molecular sieve can be microporous or mesoporous pores with pore diameters ranging from 3 Å-5 Å for microporous and from 2 nm-50 nm for mesoporous pores, although 3 Å is ideal. Molecular sieves can include, but are not limited to, aluminosilicate zeolites, porous glass, active carbon, clays, silicon dioxide, and combinations thereof. JACAAB P3 is a castor oil and zeolite aluminosilicate molecular sieve available from Univar Solutions, Dublin, Ohio. In some embodiments, the core can comprise one or more molecular sieves and/or moisture scavengers ranging from 0 to about 10 parts per hundred parts resin (of polyol) (e.g., 0 to 1, about 1 to 2, about 2 to 3, about 3 to 4, about 4 to 5, about 5 to 6, about 6 to 7, about 7 to 8, about 8 to 9, or about 9 to 10).

In some embodiments, the core has several desirable physical characteristics including, for example, lower density, increased dimensional stability, and enhanced flexural strength. The density of the core can range from about 0.6 g/cm$^3$ (37.5 lbs/ft$^3$) to about 2.2 g/cm$^3$ (137.3 lbs/ft$^3$) (e.g., about 0.6 g/cm$^3$, about 0.7 g/cm$^3$, about 0.8 g/cm$^3$, about 0.9 g/cm$^3$, about 1.0 g/cm$^3$, about 1.1 g/cm$^3$, about 1.2 g/cm$^3$, about 1.3 g/cm$^3$, about 1.4 g/cm$^3$, about 1.5 g/cm$^3$, about 1.6 g/cm$^3$, about 1.8 g/cm$^3$, about 2.0 g/cm$^3$, or about 2.2 g/cm$^3$, or any range within these values, e.g., 0.7-1.2 g/cm$^3$). In some embodiments, when the core is used to form wall paneling, the density can be much lower, such as, for example, as low as about 0.4 g/cm$^3$ (25.0 lbs/ft$^3$).

Dimensional stability, as set out in ISO 23999:2018 measures the ability of a resilient floor covering to retain its original dimensions after exposure to heat, under specified conditions. Vertical deformations, or curling deformations, are measured before and after exposure to a heat treatment. The vertical distance between the support plate and the wear surface of the test specimen is measured in four places around the edge, usually the corners, where the distance is greatest. Test specimens are placed horizontally onto support plates previously placed in the oven. The test specimen are allowed to come to the test temperature of 80±2° C. and maintained at this temperature for 6 hours #15 minutes. The test specimen are removed from the oven and allowed to recondition for 24 hours. In some embodiments, other temperatures and/or times can be used to test the dimensional stability. Measurements of size change due to heat exposure can be collected within two minutes from the test specimen coming out of the oven and prior to reconditioning. Such measurement can indicate enhanced dimensional stability of a polymer-based core prior to reconditioning.

The dimensional stability can be determined by calculating the dimensional change in both the vertical direction and horizontal direction of the specimen. For each measurement, the change is relative to the initial length (in both the horizontal and vertical directions). The linear change, $dL_{complete}$, expressed as a percentage, is given by the following formula:

$$dL_{complete} = \frac{(L_0 - L_1)}{L_0} \times 100,$$

where $L_0$ is the initial length and $L_1$ is the length after reconditioning.

The hot linear change, $dL_{hot}$ can similarly be determined by calculating the dimensional change for each measurement in both the vertical direction and horizontal direction related to the initial length, and $L_{1,hot}$ is the length after hot test.

$$dL_{hot} = \frac{(L_0 - L_{1,hot})}{L_0} \times 100$$

For a multilayer floor panel to satisfy the European Standard according to EN 16511:2014+A1:2019, the dimensional stability due to variation of temperature must be equal to or lesser than 0.25% at 80° C. Evaluating the polyurethane core alone can be a useful predictor of the performance of a multilayer floor panel incorporating the polyurethane core. In some embodiments, when the polyurethane core is measured under the standard ISO 23999:2018 and exposed to a uniform temperature of 70° C.±2° C. for 6 hours±15 minutes, and then recovered for 24 hours, the polyurethane core can exhibit a dimensional stability equal to or less than 0.25% change at 70° C. (e.g., 0.25% or less, 0.20% or less, 0.15% or less, 0.10% or less, 0.09% or less, 0.08% or less, 0.07% or less, 0.06% or less, 0.05% or less, 0.04% or less, 0.03% or less, 0.02% or less, 0.01% or less, or any range within these values, e.g., 0.08-0.20%).

In some embodiments, when the polyurethane core is measured under the standard ISO 23999:2018, exposed to a uniform temperature of 80° C.±2° C. for 6 hours #15 minutes, and then recovered for 24 hours, the polyurethane core can exhibit a dimensional stability equal to or less than 0.40% change at 80° C. (e.g., 0.40% or less, 0.35% or less, 0.30% or less, 0.25% or less, 0.20% or less, 0.15% or less, 0.10% or less, 0.09% or less, 0.08% or less, 0.07% or less, 0.06% or less, 0.05% or less, 0.04% or less, 0.03% or less, 0.02% or less, 0.01% or less, or any range within these values, e.g., 0.08-0.20%).

In some embodiments, the core may exhibit a vertical dimensional stability at 70° C. different than a horizontal dimensional stability. For example, the core (or entire floor/ wall panel) can have a vertical dimensional stability at 70° C. at approximately 0.25% and a horizontal dimensional stability at 70° C. at approximately 0.11%, with warping at 70° C. ranging from about −0.5 mm to about +0.5 mm.

In some embodiments, the core may exhibit a vertical dimensional stability at 80° C. different than a horizontal dimensional stability. For example, the core can have a vertical dimensional stability at 80° C. at approximately 0.20% and a horizontal dimensional stability at 80° C. approximately 0.22%, and warping at 80° C. ranging from about −1.8 mm to about +0.5 mm. In certain embodiments, the dimensional stability of the core at 70° C. compared to 80° C. may only change by about 0.01% to about 0.30% (e.g., from about 0.01% to 0.05%, from about 0.05% to 0.10%, from about 0.10% to 0.15%, from about 0.15% to 0.20%, from about 0.20% to 0.25%, or from about 0.25% to 0.30%).

The flexural strength of the core can be determined using a three-point flexural test, as described in ISO 178:2019. For a rectangular test specimen, the flexural strength, σ, is measured by the following formula:

$$\sigma = \frac{3FL}{2bd^2},$$

where F is the load (force) at the fracture point, L is the length of the support span, b is the width, and d is the thickness.

In some embodiments, the core can have a thickness ranging from about 1 mm to about 11 mm (e.g., about 1 mm, about 1.2 mm, about 1.5 mm, about 1.8 mm, about 2 mm, about 2.2 mm, about 2.5 mm, about 2.8 mm, about 3 mm, about 3.2 mm, about 3.5 mm, about 3.8 mm, about 4 mm, about 4.2 mm, about 4.5 mm, about 4.8 mm, about 5 mm, about 5.2 mm, about 5.5 mm, about 5.8 mm, about 6 mm, about 6.2 mm, about 6.5 mm, about 6.8 mm, about 7 mm, about 7.2 mm, about 7.5 mm, about 7.8 mm, about 8 mm, about 8.2 mm, about 8.5 mm, about 8.8 mm, about 9 mm, about 9.2 mm, about 9.5 mm, about 9.8 mm, about 10 mm, about 10.2 mm, about 10.5 mm, about 10.8 mm, or about 11 mm, or any range within these values, e.g., 3.5-4.5 mm).

In some embodiments, a core having a thickness of about 4 mm can exhibit a flexural strength of at least 30 MPa (e.g., 30 MPa or greater, 40 MPa or greater, 50 MPa or greater, 60 MPa or greater, 70 MPa or greater, 80 MPa or greater, 100 MPa or greater, 150 MPa or greater, or any range within these values, e.g., 40-80 MPa). In another embodiment, the core can have a thickness of about 6.4 mm, wherein the core can exhibit a flexural strength of at least 100 MPa (e.g., 100 MPa or greater, 110 MPa or greater, 120 MPa or greater, 130 MPa or greater, 140 MPa or greater, 150 MPa or greater, 160 MPa or greater, 170 MPa or greater, 180 MPa or greater, 200 MPa or greater, 250 MPa or greater, or any range within these values, e.g., 110-140 MPa).

In certain embodiments, the core having about 4 mm thickness may exhibit a flexural strength ranging from 39.6 MPa (5740 lbF/in$^2$) to 63.4 MPa (9200 lbF/in$^2$), although flexural strength of the core can vary above or below the range provided and may depend on the density of the core.

In some embodiments, additional layers can be added to the core 100 for reinforcement and/or to form engineered panels such as floor or wall panels 200. The floor or wall panels 200 can include substrates 102, 104 such as, for example, outer image/decorative print layers, laminate layers, protective layers, internal layers, and/or backing layers.

In certain embodiments, the flooring panels can comprise one or more of the additional layers having polyurethane compositions, which can be substantially similar to the polyurethane composition of the core. For example, in some embodiments, a protective layer, decorative print layer, core layer, and underlayment layer may comprise a polyurethane formulation. The polyurethane formulations used in each layer can be made from the reaction from a polyol and iscocyanate, wherein the polyol is made, at least in part, from one or more recycled materials, as discussed herein. In any of the embodiments disclosed herein, the flooring panels can comprise one or more additional layers having non-polymer or polymer-based compositions different than the polyurethane composition of the core, such as, for example, fiberglass, polyester, propylene, polyvinyl, or other.

As previously mentioned, for a multilayer floor panel to satisfy the European Standard according to EN 16511:2014+A1:2019, the dimensional stability due to variation of temperature must be equal to or lesser than 0.25% at 80° C. In some embodiments, the multilayer floor or wall panel having a substrate such as a decorative print layer, a protective layer, internal layers, and/or an underlayment and a core comprising the sustainable resilient polyurethane core may exhibit enhanced dimensional stability. For example, when exposed to a uniform temperature of 70° C.±2° C. for 6 hours ±15 minutes, and then recovered for 24 hours, the multilayer floor or wall panel can exhibit can exhibit a dimensional stability (vertical and/or horizontal) equal to or less than 0.25% change at 70° C. (e.g., 0.25% or less, 0.20% or less, 0.15% or less, 0.10% or less, 0.09% or less, 0.08% or less, 0.07% or less, 0.06% or less, 0.05% or less, 0.04% or less, 0.03% or less, 0.02% or less, 0.01% or less, or any range within these values, e.g., 0.08-0.20%). In some embodiments, the vertical dimensional stability of the floor or wall panel can be within the range of about 0.08% to about 0.13% change and the horizontal dimensional stability of the floor or wall panel can be within the range of about 0.09% to about 0.12%.

When exposed to an increased uniform temperature of 80° C.±2° C. for 6 hours±15 minutes, and then recovered for 24 hours, the multilayer floor or wall panel can exhibit can exhibit a dimensional stability (horizontal and/or vertical) equal to or less than 0.25% change at 80° C. (e.g., 0.25% or less, 0.20% or less, 0.15% or less, 0.10% or less, 0.09% or less, 0.08% or less, 0.07% or less, 0.06% or less, 0.05% or less, 0.04% or less, 0.03% or less, 0.02% or less, 0.01% or less, or any range within these values, e.g., 0.08-0.20%). In some embodiments, the vertical dimensional stability of the floor or wall panel can be within the range of about 0.12% to about 0.14%, and the horizontal dimensional stability can be within the range of about 0.13% to about 0.14. In certain embodiments, the dimensional stability of the floor or wall panel may surprisingly only change by about 0.01% to about 0.06% between the tested oven temperatures of 70° C. to 80° C.

In some embodiments, floor or wall panels may comprise a core having mechanical locking systems (e.g., tongue and groove), such that the first edge of a panel can connect and lock together with a second edge of an adjacent panel. In some embodiments, the core formulations disclosed herein increase the locking strength and makes it easier to position the locking element into the locking groove.

Locking strength or force strength of mechanically assembled floor or wall panels with mechanical locking systems can be determined by pulling apart adjacent panels to an opening of 0.22 mm or until the lock breaks, whichever occurs first. A tensile testing machine with two clamping devices attached with grippers for holding a specimen. The tensile testing machine is calibrated in accordance with ISO 7500-1:2018 and ISO 24334:2019 and conformed to class 3 for the force range for the locking strength measurement. The length, width, and thickness of the specimen is measured to be about 2 mm, about 3 mm, about 4 mm, about 5 mm, about 6 mm, about 7 mm, about 8 mm, about 9 mm, about 10 mm, or about 11 mm within an accuracy of 0.1 mm. The specimen can be sawed to particular dimensions and balanced with an accuracy of 0.1 g. An external extensometer or other optical measurement system is set up to measure the extension of the specimen with an accuracy of 0.01 mm.

In some embodiments, assembled floor or wall panels comprising the sustainable resilient polyurethane core can have a locking strength of at least 8 kN/m for the long sides of the panels (e.g., 8.0 kN/m, about 8.5 kN/m, about 9.0 kN/m, about 9.5 kN/m, about 10.0 kN/m, about 10.5 kN/m, about 11.0 kN/m, about 11.5 kN/m, about 12.0 kN/m, about 12.5 kN/m, about 13.0 kN/m, about 14.0 kN/m, or any range within these values, e.g., 9.0-11.5 kN/m). In some embodiments, assembled floor or wall panels comprising the sustainable resilient polyurethane core can have a locking strength of at least 7 KN/m for the short sides of the panels (e.g., 7.0 kN/m, about 7.2 kN/m, about 7.4 kN/m, about 7.6 kN/m, about 7.8 kN/m, about 8.0 kN/m, about 8.5 kN/m, about 9.0 kN/m, about 9.5 kN/m, about 10.0 kN/m, about 10.5 kN/m, about 11.0 kN/m, about 11.5 kN/m, about 12.0 kN/m, about 13.0 kN/m, about 14.0 kN/m, or any range within these values, e.g., 7.6-9.0 kN/m). Compared to the assembled floor or wall panels comprising a polyvinyl-based core having an average locking strength of about 4.4 kN/m on the long side and 8.7 kN/m on the short side, the locking strength of the assembled floor or wall panels comprising the sustainable resilient polyurethane core can be substantially enhanced.

The short-term indentation and residual indentation of the planks are measured as outlined in ASTM F1700-20 and/or ASTM F1914-18. This test method measures short-term indentation of resilient floor or wall panels and is useful as a predictor of performance in actual installations over time. The indentation of a resilient floor covering is measured using a specific type of indentor, flat or spherical, under a specified load and time and can be measured after initial load, and after a specified recovery time. The indentation tester is a spherical foot device consisting essentially of a rigidly mounted indentor acting under an initial load of 2.00±0.02 lbf (8.90±0.09 N) and a total deadweight load of 30.00 lbf±0.25 lbf (133.45±1.11 N) with a suitable dial indicator, calibrated in 0.0005 in. (0.01 mm) increments. The spherical foot shall be 0.250±0.0005 in. (6.35±0.01 mm) in diameter. Another indentation tester consists of a dead weight loaded indentor with interchangeable feet of variante geometry. The device is be equipped with a dial gage indicator to measure the depth of indentation and has a rigid metal plate for supporting the specimen.

The test specimen is conditioned either in air maintained at 73.4±3.6° F. (23±2° C.) and 50±5% relative humidity or by water immersion between 15 minutes and 30 minutes before testing, where the water temperature is maintained at 77±0.9° F. (25±0.5° C.) or 115±1° F. (46±0.5° C.).

After measuring the initial thickness of the conditioned sustainable resilient plank, the flat indentor foot of 0.178 in. (4.52 mm) in diameter applies the total load of 140 lb for 10 minutes±2 seconds, 30 minutes±2 seconds or for 60±1 minute. The indentation is read from the dial indicator after the required time has elapsed and the thickness value recorded to the nearest 0.001 in. (0.025 mm). After recovery for a specific amount of time, usually 60 minutes the thickness at the same point where the initial measurement was made is recorded to the nearest 0.001 in. (0.025 mm).

In some embodiments, floor or wall panels comprising the sustainable resilient polyurethane core can have a short-term indentation and residual indention less than about 2% (e.g., less than 2.0%, less than 1.9%, less than 1.8%, less than 1.7%, less than 1.6%, less than 1.5%, less than 1.4%, less than 1.3%, less than 1.2%, less than 1.1%, less than 1.0%, less than 0.9%, less than 0.8%, less than 0.7%, less than 0.6%, less than 0.5%, less than 0.4%, less than 0.3%, less than 0.2%, less than 0.1%, or any range within these values, e.g., 0.9-1.7%). Compared to floor or wall panels comprising the a polyvinyl-based core having an average short-term indentation and residual indention around 2.9%, floor or wall panels comprising the sustainable resilient polyurethane core exhibit increased rigidity.

Similar to the short-term indentation, the static load limit test of floor or wall panels, according to ASTM F970-17, measures the indentation recovery properties of resilient floor or wall panels and is useful as a predictor of performance in actual installations over time. An initial thickness of the specimen is measured and recorded to the nearest 0.001 in. (0.025 mm). A load of either 75 lbs, 125 lbs, 175 lbs, 250 lbs, or 1,000 lbs is applied for 24 hours±15 minutes. After the load is removed, the specimens are allowed to recover for 24 hours±15 minutes. The final thickness is measured to the nearest 0.001 in. (0.025 mm) to determine the long-term static load limit of the specimen.

In some embodiments, floor or wall panels comprising the sustainable resilient polyurethane core can have a long-term indentation, or thickness change, of less than about 0.1 mm with a static load of 250 lbs for 24 hours (e.g., less than about 0.10 mm, less than about 0.09 mm, less than about 0.08 mm, less than about 0.07 mm, less than about 0.06 mm, less than about 0.05 mm, less than about 0.04 mm, less than about 0.03 mm, less than about 0.02 mm, less than about 0.01 mm, or any range within these values, e.g., 0.07-0.09 mm). In some embodiments, floor or wall panels comprising the sustainable resilient polyurethane core can have a long-term indentation, or thickness change, of less than about 0.2 mm with a static load of 1,000 lbs for 24 hours (e.g., less than about 0.20 mm, less than about 0.18 mm, less than about 0.16 mm, less than about 0.14 mm, less than about 0.12 mm, less than about 0.10 mm, less than about 0.09 mm, less than about 0.08 mm, less than about 0.07 mm, less than about 0.06 mm, less than about 0.05 mm, less than about 0.04 mm, less than about 0.03 mm, less than about 0.02 mm, less than about 0.01 mm, or any range within these values, e.g., 0.08-0.14 mm). Compared to floor or wall panels comprising the a polyvinyl-based core having an average high-term indentation of 0.26 mm with a 250 lb static load limit and 0.66 mm with a 1,000 lb static load limit, floor or wall panels comprising the sustainable resilient polyurethane core exhibit increased rigidity.

The caster chair test assesses the durability of a floor panel assembly by simulating the conditions that floor covering panels would be subjected to in real use. The test specimen includes a floor covering having one or more joints, assembled as necessary (e.g., welding, clicked together using locking elements, or glued). The appearance and stability and/or flatness of a floor panel is measured by detachment of layers, opening of joints, or curling of a resilient or laminate floor covering under the movement of a castor chair. The castor chair loaded with a mass of approximately 198 lbs±2 lbs (90 kg±1 kg) moves in epicyclical paths with multiple changes of direction, stops and starts, and the frequency of passage varies from area to area. Three different assessments include (1) the change in appearance of a test specimen after 5,000 cycles and 25,000 cycles, in accordance with ISO 9405; (2) the change in color is assessed by means of grey scales after 750 cycles; and (3) the extent of deterioration of the test specimen is assessed after 10,000 cycles or 25,000 cycles.

In some embodiments, floor or wall panels comprising the sustainable resilient polyurethane core can undergo 10,000 cycles of the castor chair test with less than about 0.10% change in flatness (e.g., less than about 0.10%, less than about 0.09%, less than about 0.08%, less than about 0.07%, less than about 0.06%, less than about 0.05%, less than about 0.04%, less than about 0.03%, less than about 0.02%, less than about 0.01%, or any range within these values, e.g., 0.05-0.09%). Compared to floor or wall panels comprising a polyvinyl-based core, 10,000 cycles of the castor chair test result in approximately 0.11% change in flatness, floor or wall panels comprising the sustainable resilient polyurethane core exhibit increased durability.

In some embodiments, floor or wall panels comprising the sustainable resilient polyurethane core can undergo 25,000 cycles of the castor chair test with less than about 0.14% change in flatness (e.g., less than about 0.14%, less than about 0.13%, less than about 0.12%, less than about 0.11%, less than about 0.10%, less than about 0.09%, less than about 0.08%, less than about 0.07%, less than about 0.06%, less than about 0.05%, less than about 0.04%, less than about 0.03%, less than about 0.02%, less than about 0.01%, or any range within these values, e.g., 0.05-0.10%).). Compared to floor or wall panels comprising a polyvinyl-based core, 25,000 cycles of the castor chair test result in approximately 0.14% change in flatness, floor or wall panels comprising the sustainable resilient polyurethane core exhibit increased durability.

In some embodiments, floor or wall panels comprising the sustainable resilient polyurethane core can undergo 75,000 cycles of the castor chair test with less than about 0.17% change in flatness (e.g., less than about 0.17%, less than about 0.16%, less than about 0.15%, less than about 0.14%, less than about 0.13%, less than about 0.12%, less than about 0.11%, less than about 0.10%, less than about 0.09%, less than about 0.08%, less than about 0.07%, less than about 0.06%, less than about 0.05%, less than about 0.04%, less than about 0.03%, less than about 0.02%, less than about 0.01%, or any range within these values, e.g., 0.08-0.15%). Given that most floor or wall panels comprising a polyvinyl-based core, which fail if subjected to 75,000 cycles of the castor chair test, floor or wall panels comprising the sustainable resilient polyurethane core exhibit increased durability.

In some embodiments, floor or wall panels comprising the sustainable resilient polyurethane core can provide enhanced insulating properties, such as, for example, an enhanced R-value ranging from about R0.4 to about R8 (e.g., about R0.4, about R0.8, about R1.2, about R1.6, about R2.0, about R2.4, about R2.8, about R3.2, about R3.6, about R4.0, about R4.4, about R4.8, about R5.2, about R5.6, about R6.0, about R6.4, about R6.8, about R7.2, about R7.6, about R8.0, or any range within these values, e.g., R1.6-R2.4).

The high-density core can be made by combining the components in Formula (I) above. In some embodiments, the components, less the isocyanate, can be preblended. The blend can be mixed with the isocyanate by means of a high pressure, impingement-style mix head. In some embodiments, the components can be mixed with low pressure, high shear mix heads. Upon mixing, an exothermic reaction leads to a rapidly expanding foam. In some embodiments, the mixture can be deposited into a mold of desired shapes and dimensions for the core, for example, panels, sheets, blocks, planks and the like, in dimensions of 4 feet by 8 feet, 4 feet by 9 feet, or 4 feet by 10 feet. Alternatively, the mixture can be deposited onto a first moving conveyor. As the foam expands, a second moving conveyor can restrict expansion to a desired core thickness by contacting the foam on the opposite surface of the first moving conveyor. Additional layers can be added above and below the core during the extrusion process in order to form panels and/or tiles. As the panels and/or tiles exit the conveyor system, the panels and/or tiles can be cut into various lengths and stacked. Width and lengths can include various dimensions, such as, for example grademark-specified plywood panel dimensions of 4 feet by 8 feet, 4 feet by 9 feet, or 4 feet by 10 feet. Additionally, grademark-specified plywood panel thicknesses range from about ¼ inch to about 1¼ inch. Additional dimensions can include 4.3 mm thickness×4.25 inch/5.59 inch/9.84 inch width×47.64 inch length. Some specialty sizes, such as smaller panels for the Japanese market, are also contemplated.

In some embodiments, the formulation for the core can be prepared as a thermoplastic or thermoset material.

The following examples further illustrate aspects of the present disclosure. However, they are in no way a limitation of the teachings or disclosure of the present disclosure as set forth herein.

EXAMPLES

Example 1: Formulations

The density, dimensional stability, and flexural strength of sustainable resilient cores were assessed for multiple formulations, including, for example, the formulations in Tables 1-8.

TABLE 1

| Component | phr | Wt % |
|---|---|---|
| Arropol 36 | 100.00 | 22.69% |
| 1,4-butanediol | 5.00 | 1.13% |
| N-200 | 0.13 | 0.03% |
| CA-71 | 5.00 | 1.13% |
| $CaCO_3$ | 200.00 | 45.38% |
| DC-193 | 0.25 | 0.06% |
| JACAAB P3 | 5.00 | 1.13% |
| MDI (Lupranate 223) | 125.37 | 28.45% |
| | 440.75 | 100% |

Figure 2A:
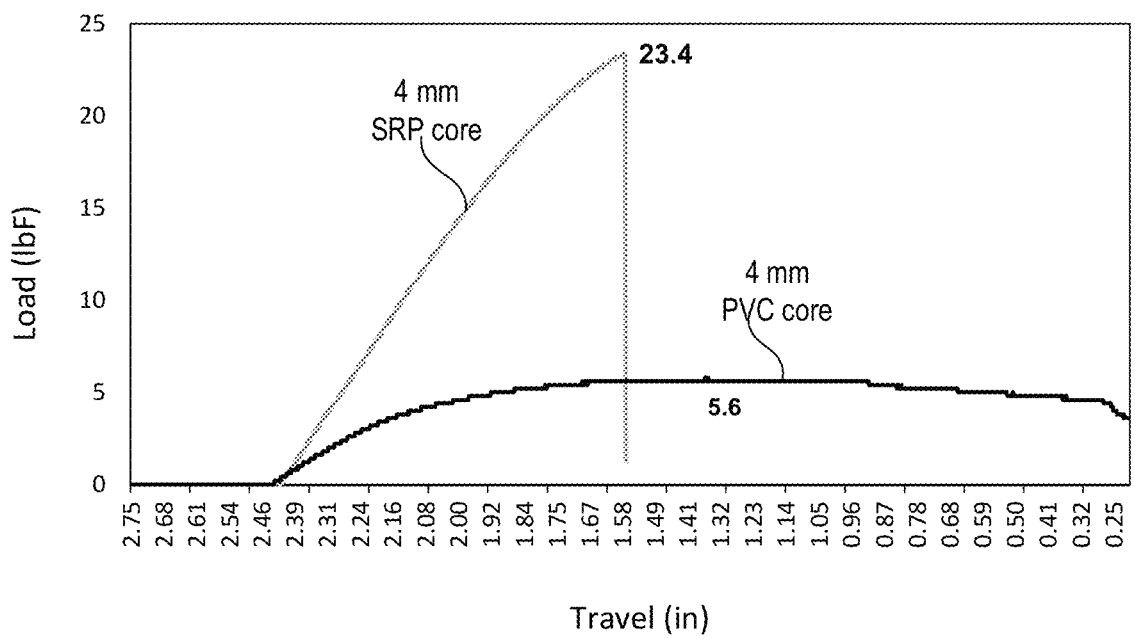
FIG. 2A shows a plot of travel (inches) versus load (lbF) of a 4 mm SRP core of the formulation of Table 1 and a 4 mm polyvinyl chloride (PVC) core, in accordance with some exemplary embodiments of the present disclosure.

The core of the formulation provided in Table 1 exhibits a density about 1.38 $g/cm^3$ (about 86 $lb/ft^3$). As shown in FIG. 2A, a test specimen having a thickness of about 4 mm exhibits a flexural strength of about 63.5 MPa (about 9200 $lbF/in^2$).

TABLE 2

| Component | phr | Wt % |
|---|---|---|
| Arropol 36 | 80.00 | 18.95% |
| polyTHF | 20.00 | 4.74% |
| 1,4-butanediol | 5.00 | 1.18% |
| N-200 | 0.13 | 0.03% |
| CA-71 | 5.00 | 1.18% |
| $CaCO_3$ | 200.00 | 47.38% |

TABLE 2-continued

| Component | phr | Wt % |
|---|---|---|
| DC-193 | 0.25 | 0.06% |
| JACAAB P3 | 5.00 | 1.18% |
| MDI (Lupranate 223) | 106.75 | 25.29% |
| | 422.13 | 100% |

Figure 2B:
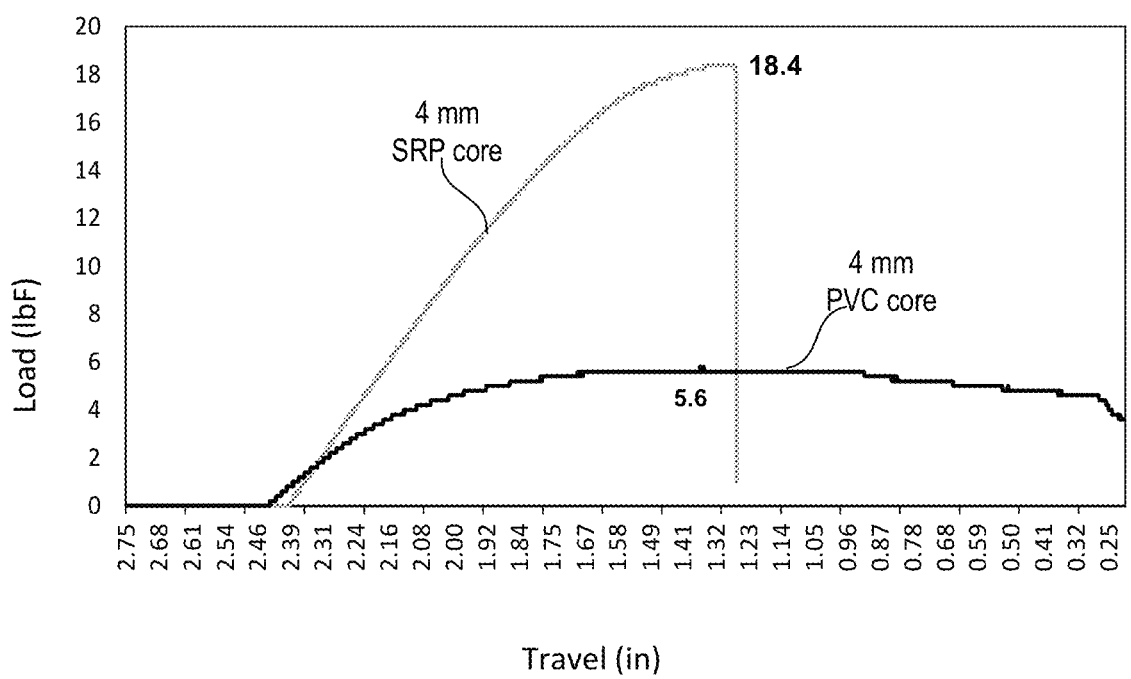
FIG. 2B shows a plot of travel (inches) versus load (lbF) of a 4 mm SRP core of the formulation of Table 2 and a 4 mm polyvinyl chloride (PVC) core, in accordance with some exemplary embodiments of the present disclosure.

The core of the formulation provided in Table 2 exhibits a density about 1.37 g/cm³ (about 85.8 lb/ft³). As shown in FIG. 2B, a test specimen having a thickness of about 4 mm exhibits a flexural strength of about 49.9 MPa (about 7234 lbF/in²).

TABLE 3

| Component | phr | Wt % |
|---|---|---|
| Arropol 36 | 100.00 | 23.71% |
| 1,4-butanediol | 5.00 | 1.19% |
| N-200 | 0.13 | 0.03% |
| CA-71 | 5.00 | 1.19% |
| CaCO₃ | 200.00 | 47.42% |
| DC-193 | 0.25 | 0.06% |
| JACAAB P3 | 5.00 | 1.19% |
| MDI (Lupranate 27) | 106.41 | 25.23% |
| | 421.79 | 100% |

Figure 2C:
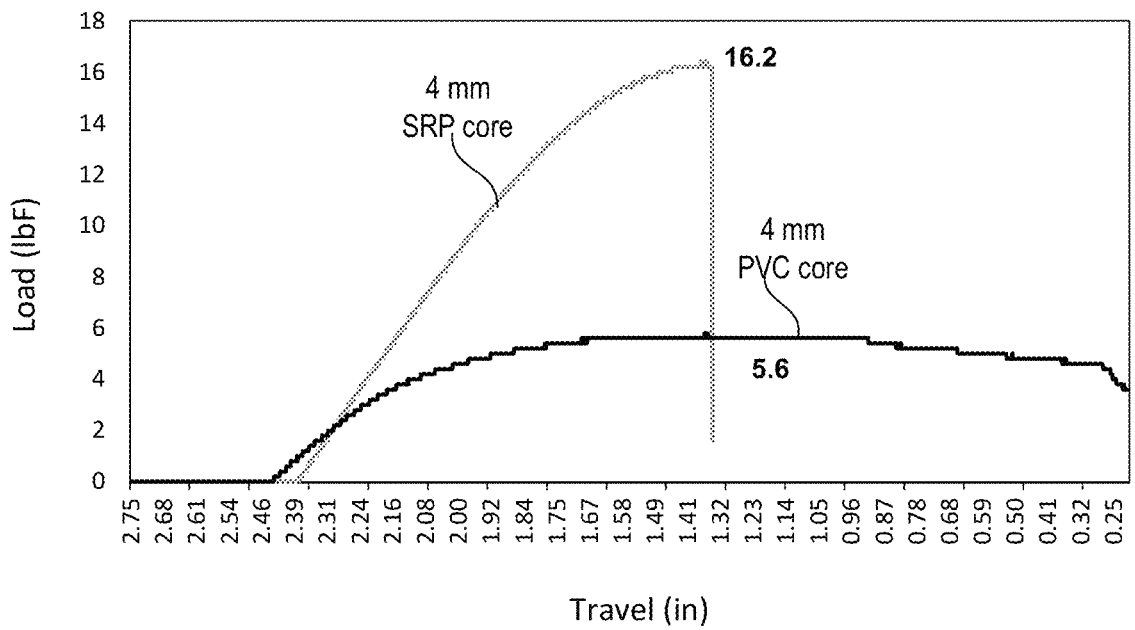
FIG. 2C shows a plot of travel (inches) versus load (lbF) of a 4 mm SRP core of the formulation of Table 3 and a 4 mm polyvinyl chloride (PVC) core, in accordance with some exemplary embodiments of the present disclosure.

The core of the formulation provided in Table 3 exhibits a density about 1.15 g/cm³ (about 71.9 lb/ft³). As shown in FIG. 2C, a test specimen having a thickness of about 4 mm exhibits a flexural strength of about 44.5 MPa (about 6448 lbF/in²).

TABLE 4

| Component | phr | Wt % |
|---|---|---|
| Arropol 36 | 80.00 | 19.71% |
| polyTHF | 20.00 | 4.93% |
| 1,4-butanediol | 5.00 | 1.23% |
| N-200 | 0.13 | 0.03% |
| CA-71 | 5.00 | 1.23% |
| CaCO₃ | 200.00 | 49.26% |
| DC-193 | 0.25 | 0.06% |
| JACAAB P3 | 5.00 | 1.23% |
| MDI (Lupranate 27) | 90.6 | 22.32% |
| | 405.98 | 100% |

Figure 2D:
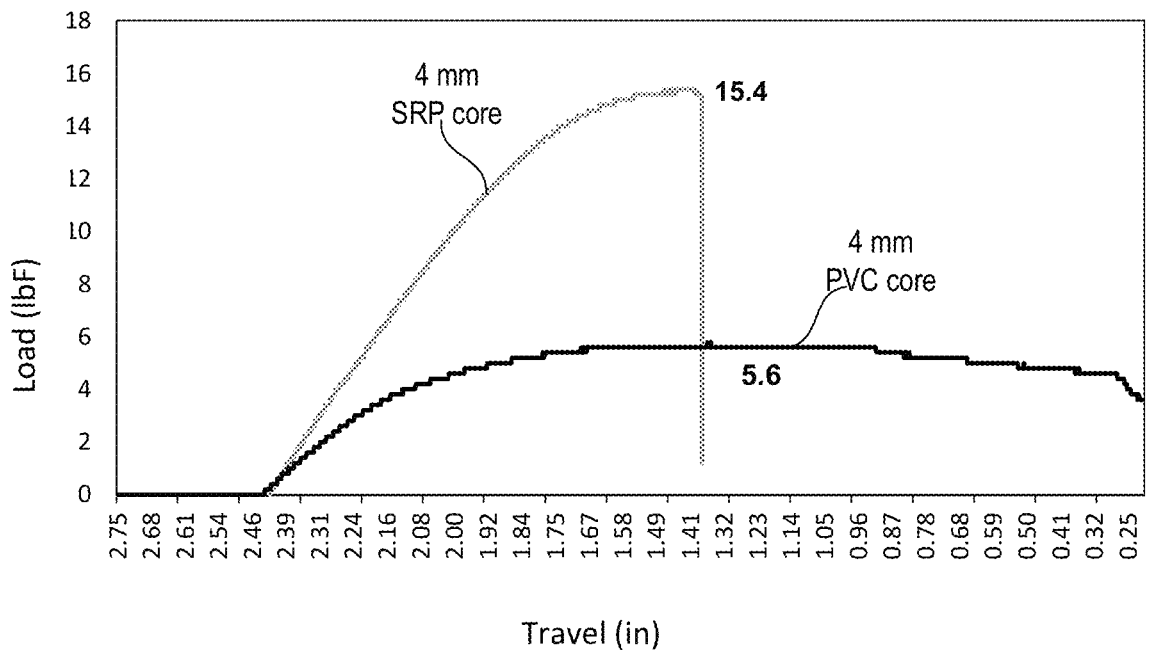
FIG. 2D shows a plot of travel (inches) versus load (lbF) of a 4 mm SRP core of the formulation of Table 4 and a 4 mm polyvinyl chloride (PVC) core, in accordance with some exemplary embodiments of the present disclosure.

The core of the formulation provided in Table 4 exhibits a density about 1.22 g/cm³ (about 76.2 lb/ft³). As shown in FIG. 2D, a test specimen having a thickness of about 4 mm exhibits a flexural strength of about 41.8 MPa (about 6065 lbF/in²).

TABLE 5

| Component | phr | Wt % |
|---|---|---|
| Terol 11 | 100.00 | 14.24% |
| Diethylene glycol | 20.00 | 2.85% |
| N-200 | 0.10 | 0.01% |
| CA-71 | 5.00 | 0.71% |
| CaCO₃ | 400.00 | 56.95% |
| DC-193 | 0.25 | 0.04% |
| JACAAB P3 | 5.00 | 0.71% |
| MDI (Lupranate 223) | 172.03 | 24.49% |
| | 702.38 | 100% |

Figure 2E:
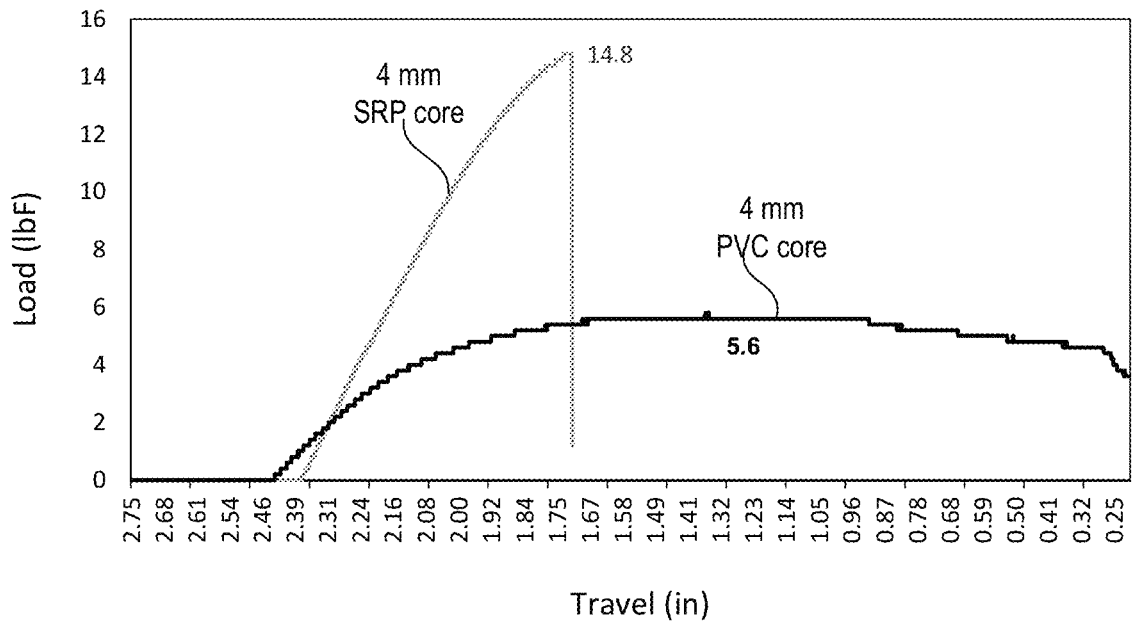
FIG. 2E shows a plot of travel (inches) versus load (lbF) of a 4 mm SRP core of the formulation of Table 5 and a 4 mm polyvinyl chloride (PVC) core, in accordance with some exemplary embodiments of the present disclosure.

The core of the formulation provided in Table 5 exhibits a density about 1.09 g/cm³ (about 67.9 lb/ft³). As shown in FIG. 2E, a test specimen having a thickness of about 4 mm exhibits a flexural strength of about 40.1 MPa (about 5819 lbF/in²).

TABLE 6

| Component | phr | Wt % |
|---|---|---|
| Terol 11 | 100.00 | 14.79% |
| Diethylene glycol | 20.00 | 2.96% |
| N-200 | 0.10 | 0.01% |
| CA-71 | 5.00 | 0.74% |
| CaCO₃ | 400.00 | 59.14% |
| DC-193 | 0.25 | 0.04% |
| JACAAB P3 | 5.00 | 0.74% |
| MDI (Lupranate 27) | 146.01 | 21.59% |
| | 676.36 | 100% |

Figure 2F:
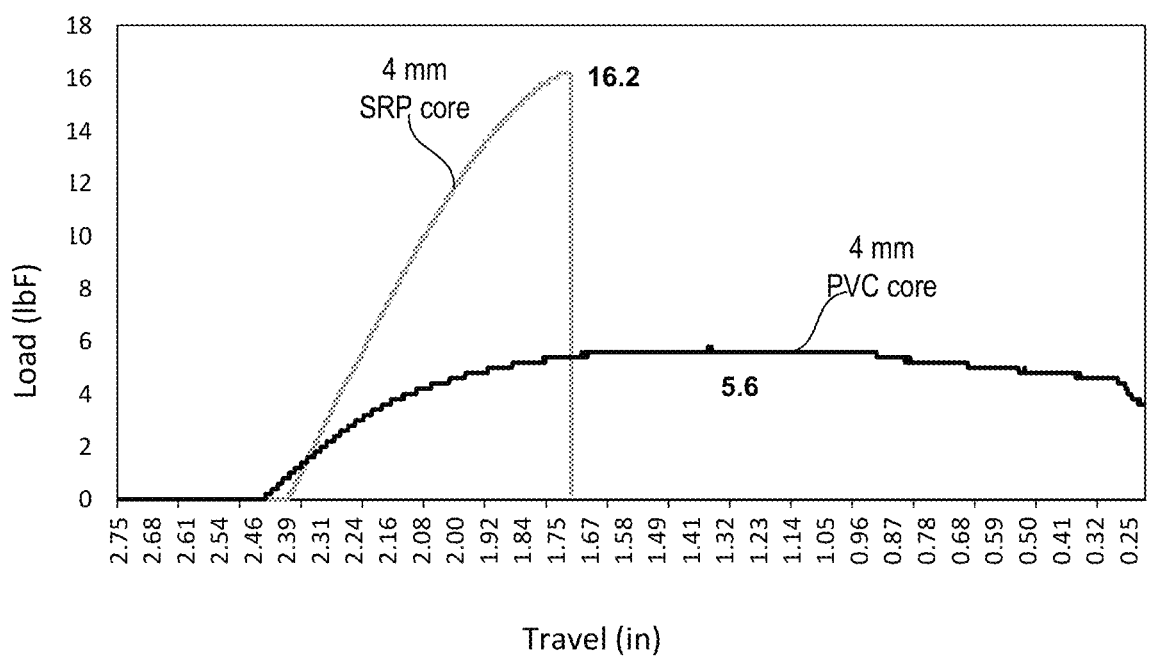
FIG. 2F shows a plot of travel (inches) versus load (lbF) of a 4 mm SRP core of the formulation of Table 6 and a 4 mm polyvinyl chloride (PVC) core, in accordance with some exemplary embodiments of the present disclosure.

The core of the formulation provided in Table 6 exhibits a density about 1.13 g/cm³ (about 70.3 lb/ft³). As shown in FIG. 2F, a test specimen having a thickness of about 4 mm exhibits a flexural strength of about 43.9 MPa (about 6369 lbF/in²).

TABLE 7

| Component | Wt % |
|---|---|
| GR-4110G | 25.63% |
| N,N-dimethylcyclohexylamine | 0.02% |
| B8454 silicone oil | 0.43% |
| CaCO₃ | 42.72% |
| Wood flour | 6.41% |
| H₂O | 0.02% |
| MDI | 24.78% |
| | 100% |

Figure 2G:
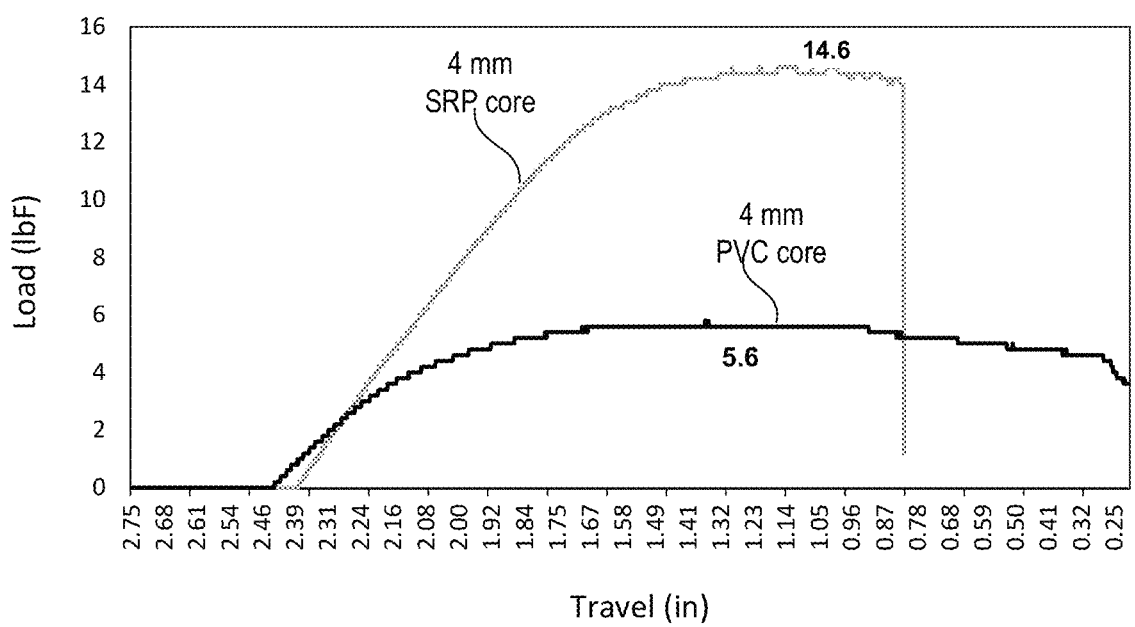
FIG. 2G shows a plot of travel (inches) versus load (lbF) of a 4 mm SRP core of the formulation of Table 7 and a 4 mm polyvinyl chloride (PVC) core, in accordance with some exemplary embodiments of the present disclosure.

The core of the formulation provided in Table 7 exhibits a density about 1.30 g/cm³ (about 81.3 lb/ft³). As shown in FIG. 2G, a test specimen having a thickness of about 4 mm exhibits a flexural strength of about 39.6 MPa (about 5740 lbF/in²).

TABLE 8

| Component | phr | Wt % |
|---|---|---|
| Arropol 36 | 100.00 | 22.58% |
| 1,4-butanediol | 5.00 | 1.13% |
| N-200 | 0.13 | 0.03% |
| CA-71 | 5.00 | 1.13% |
| CaCO₃ | 200.00 | 45.17% |
| DC-193 | 0.25 | 0.06% |
| JACAAB P3 | 5.00 | 1.13% |
| PVB-BUTVAR 90 | 2.00 | 0.45% |
| MDI (Lupranate 223) | 125.37 | 28.32% |
| | 442.75 | 100% |

The core of the formulation provided in Table 8 exhibits a density about 1.37 g/cm³ (about 85.8 lb/ft³).

A test specimen having a polyvinyl-based core and a thickness of about 4 mm exhibits a density about 0.99 g/cm³ (about 62 lb/ft³) and a flexural strength of about 15.2 MPa (about 2202 lbF/in²).

Example 2: Dimensional Stability of the Sustainable Resilient Core

The core comprising the polyurethane formulations provided in Tables 1-8 and having a thickness of 4.0 mm were created as test specimen. Dimensional stability of the test specimen are measured by change or expansion when exposed to the increased temperature such as 70° C. and 80° C., each for 6 hours, as outlined in ISO 23999:2018. The core test specimen experience minimal change or expansion when exposed to 70° C. or 80° C. for 6 hours and allowed to recover for 24 hours. The vertical dimensional stability of the floor or wall panel test specimen expanded from about 0.19% to about 0.25% at 70° C., whereas a polyvinyl-based core expanded about 0.21% at 70° C. The vertical dimensional stability of the core test specimen expanded from about 0.20% to about 0.22% at 80° C., whereas a polyvinyl-based core expanded from about 0.57% to about 0.83% at 80° C. Importantly, the core test specimen experienced a change in dimensional stability between 70° C. to 80° C. by approximately 0.01% to about 0.06%, whereas polyvinyl-based core experienced a change in dimensional stability between 70° C. to 80° C. by approximately 0.36% to approximately 0.62%

Example 3: Flexural Strength of the Sustainable Resilient Core

The core comprising the polyurethane formulations provided in Tables 1-8 and having a thickness of 4.0 mm were created as test specimen. Flexural strength was measured on a three-point bend fixture having 6.5 inch spacing between the supports and a 2 inch per minute travel head. All test specimen were 1 inch by 9 inch with 4 mm (0.158 inch) thickness, as outlined in ISO 178:2019.

Figure 3A:
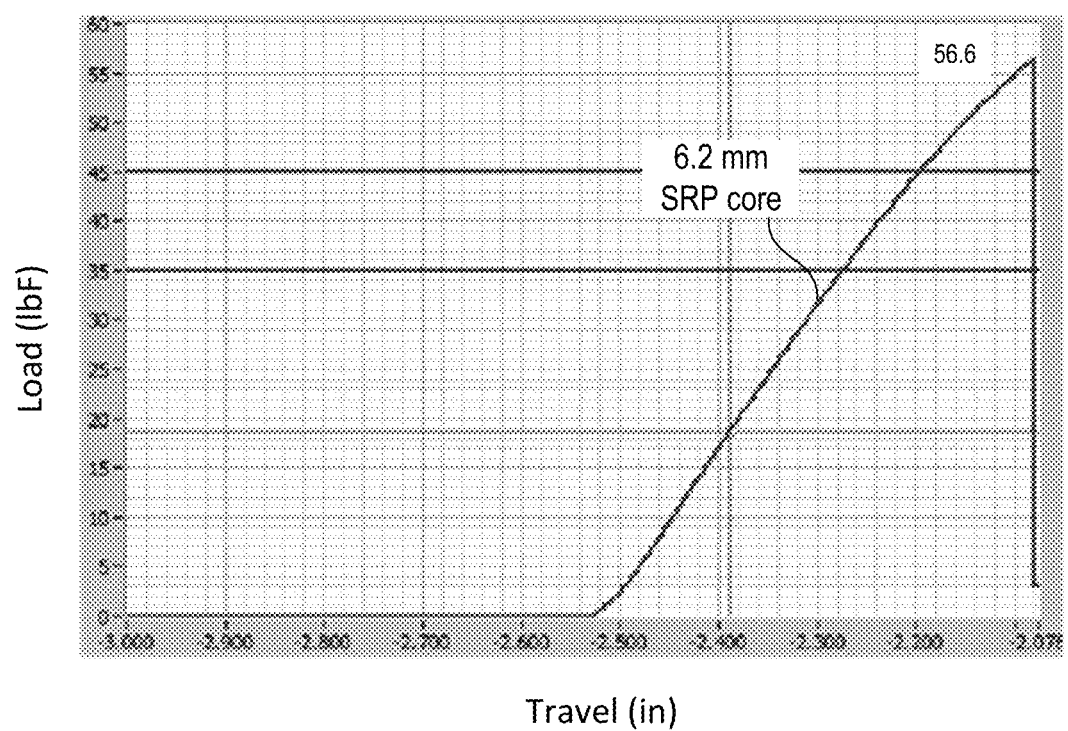
FIG. 3A shows a plot of travel (inches) versus load (lbF) of a 6.2 mm SRP core, in accordance with some exemplary embodiments of the present disclosure.
Figure 3B:
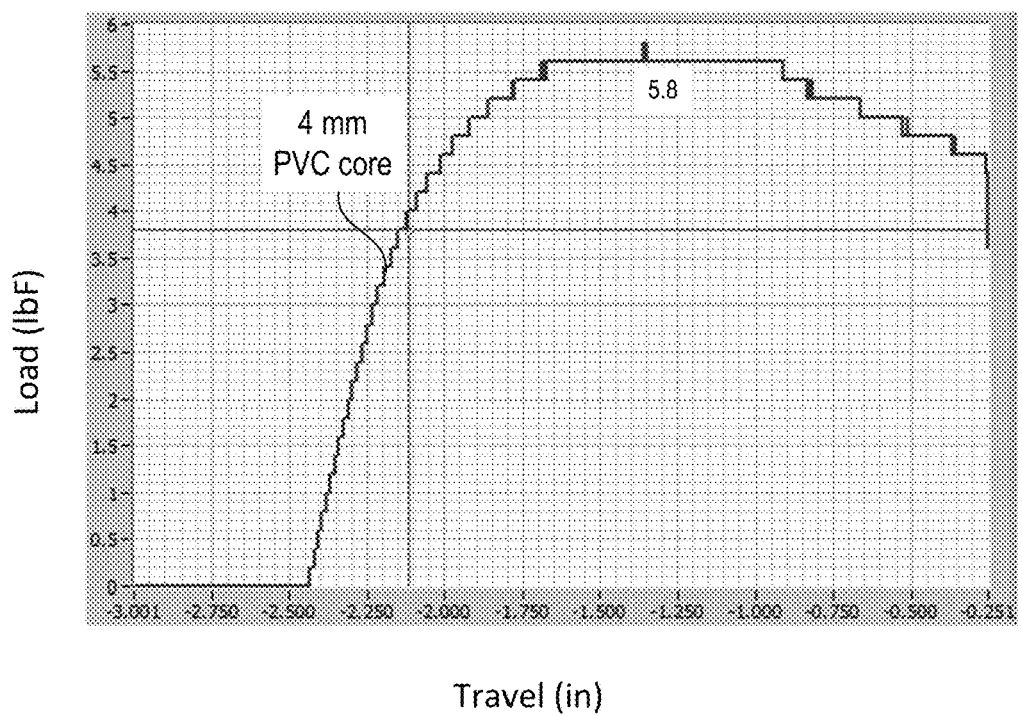
FIG. 3B shows a plot of travel (inches) versus load (lbF) of a 4 mm PVC core, in accordance with some exemplary embodiments of the present disclosure.
Figure 3C:
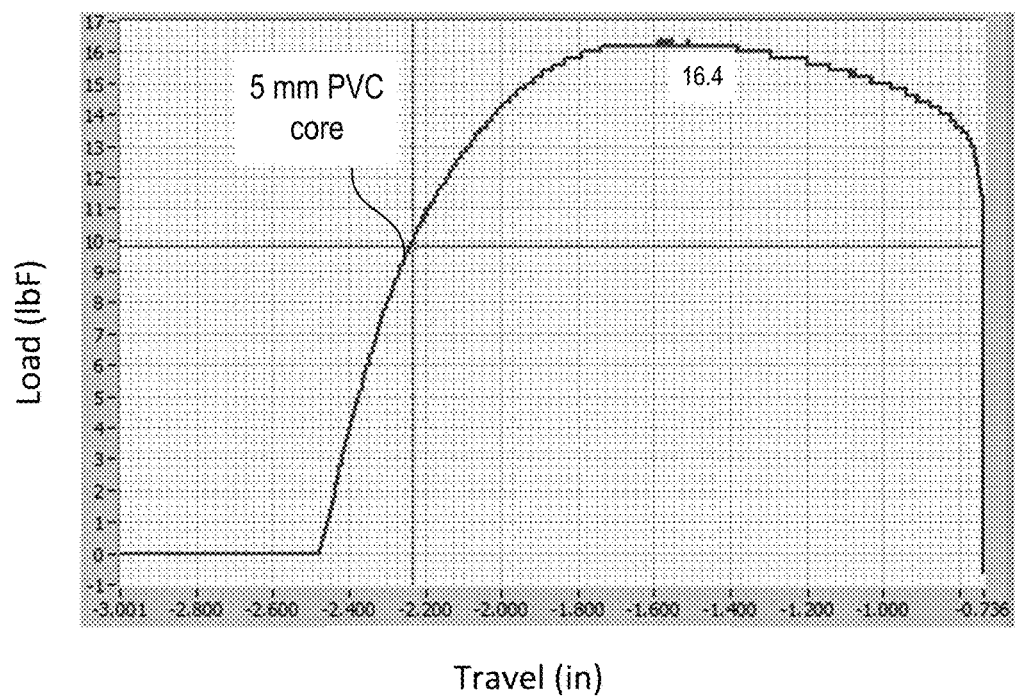
FIG. 3C shows a plot of travel (inches) versus load (lbF) of a 5 mm PVC core, in accordance with some exemplary embodiments of the present disclosure.

The flexural strength of a polyurethane core test specimen should be at least 38.5 MPa (5582 lbF/in$^2$). As shown in FIG. 3A, a polyurethane core test specimen having a thickness of 6.2 mm exhibited a flexural strength of 60.9 MPa (8830 lbF/in$^2$). As shown in FIGS. 2A-2G, compared to the flexural strength of the polyvinyl-based cores having a 4.0 mm thickness (FIGS. 2A-2G, 3B), 5.0 mm thickness (FIG. 3C), the sustainable resilient plank core comprised of the polyurethane formulation provided in Tables 1-8 is substantially stronger.

Example 4: Dimensional Stability of the Sustainable Resilient Plank

Multi-layered planks having dimensions of 190 mm×1210 mm×6.7 mm with 1.2 mm top layer, 4.0 mm core comprised of the polyurethane formulation provided in Tables 1-8, and 1.5 mm substrate layer were created as test specimen. Dimensional stability of the test specimen are measured by change or expansion when exposed to the increased temperature such as 70° C. and 80° C., each for 6 hours, as outlined in ISO 23999:2018. The floor or wall panel test specimen experience minimal change or expansion when exposed to 70° C. or 80° C. for 6 hours and allowed to recover for 24 hours. The vertical dimensional stability of the floor or wall panel test specimen expanded from about 0.08% to about 0.13% at 70° C., whereas a plank comprised of a polyvinyl core expanded about 0.15% at 70° C. The vertical dimensional stability of the floor or wall panel test specimen expanded from about 0.12% to about 0.14% at 80° C., whereas a test specimen comprised of a polyvinyl-based core expanded from about 0.33% to about 0.39% at 80° C. Importantly, the floor or wall panel test specimen experienced a change in dimensional stability between 70° C. to 80° C. by approximately 0.01% to about 0.06%, whereas the floor or wall panel test specimen comprised of polyvinyl-based core experienced a change in dimensional stability between 70° C. to 80° C. by approximately 0.18% to approximately 0.24%

Example 5: Force Strength of the Sustainable Resilient Plank

Multi-layered planks having dimensions of 190 mm×1210 mm×6.7 mm with 1.2 mm top layer, 4.0 mm core comprised of the polyurethane formulation provided in Tables 1-8, and 1.5 mm substrate layer were created as test specimen. The tensile testing machine is calibrated in accordance with ISO 7500-1:2018 and conformed to class 3 for the force range for the locking strength measurement. The long side of the floor or wall panel test specimen outperformed the short side and exhibited a locking and/or force strength of 10.94 kN/m. The short side exhibited a locking and/or force strength of 7.78 kN/m.

Example 6: Short-Term Indentation and Residual Indentation of the Sustainable Resilient Plank Multi-layered planks having dimensions of 190 mm×1210 mm×6.7 mm with 1.2 mm top layer, 4.0 mm core comprised of the polyurethane formulation provided in Tables 1-8, and 1.5 mm substrate layer were created as test specimen. The test specimen underwent a static load limit test according to ASTM F1700-20 and/or ASTM F1914-18. In particular, a load of 140 lbs was loaded on the test specimen for 60 minutes and allowed to recover for 60 minutes. The test specimen experienced a 1.73% residual indentation.

Example 7: Static Load Limit of the Sustainable Resilient Plank

Multi-layered planks having dimensions of 190 mm×1210 mm×6.7 mm with 1.2 mm top layer, 4.0 mm core comprised of the polyurethane formulation provided in Tables 1-8, and 1.5 mm substrate layer were created as test specimen. Test specimen underwent a static load limit test according to ASTM F970-17. In particular, a load of 250 lbs was loaded on the test specimen for 24 hours and allowed to recover for 24 hours. The test specimen experienced a change in thickness by 0.05 mm. When a load of 1,000 lbs was loaded on the test specimen for 24 hours, the test specimen thickness changed by 0.07 mm.

Example 8: Caster Test of the Sustainable Resilient Plank

Multi-layered planks having dimensions of 190 mm×1210 mm×6.7 mm with 1.2 mm top layer, 4.0 mm core comprised of the polyurethane formulation provided in Tables 1-8, and 1.5 mm substrate layer were assembled to have several joints and prepared as test specimen for the caster chair test according to ISO 4918:2016 and ISO 9405. After 10,000 cycles, the test specimen maintained a good appearance and experienced a change in flatness by 0.08%. After 25,000 cycles, the test specimen maintained a good appearance and experienced a change in flatness by 0.11%. After 75,000 cycles, well above the tested castor chair test cycle requirement, the test specimen maintained a good appearance and experienced a change in flatness by 0.13%.

It is to be understood that the embodiments and claims disclosed herein are not limited in their application to the details of construction and arrangement of the components set forth in the description and illustrated in the drawings.

Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

What is claimed is:

1. A floor or wall covering panel comprising:
   a thermoplastic polyurethane core comprising:
      a polyol made, at least in part, from one or more recycled materials;
      an isocyanate; and
      at least one filler;
   at least one substrate located beneath the core; and
   at least one protective layer located above the core.

2. The panel of claim 1, wherein the core further comprises one or more additives.

3. The panel of claim 1, wherein the at least one filler comprises calcium carbonate.

4. The panel of claim 1, wherein the core has a thickness of from about 1.0 mm to about 4.0 mm.

5. The panel of claim 1, further comprising an internal layer located between the core and the at least one protective layer, the internal layer comprising a thermoplastic polyurethane.

6. The panel of claim 5, wherein the thermoplastic polyurethane of the internal layer comprises the polyol and the isocyanate.

7. The panel of claim 1, further comprising a reinforcing fiberglass layer located adjacent to the core.

8. The panel of claim 1, further comprising a decorative print layer located between the core and the at least one protective layer.

9. The panel of claim 1, wherein the substrate comprises a foam underlayment.

10. The panel of claim 9, wherein the foam underlayment is a polyurethane-based underlayment.

11. The panel of claim 1, wherein the at least one protective layer comprises a polyurethane-based protective layer.

12. The panel of claim 1, wherein the panel exhibits a first dimensional stability expressed as a percentage at 70° C. and a second dimensional stability expressed as a percentage at 80° C., wherein the second dimensional stability is less than 0.20 greater than the first dimensional stability.

13. The panel of claim 1, wherein the core exhibits a flexural strength from about 30 MPa to about 80 MPa.

14. The panel of claim 1, wherein the panel has a residual indentation less than 2%.

15. The panel of claim 1, wherein the panel has a long-term indentation less than 0.20 mm.

* * * * *